US012353450B2

(12) United States Patent
Smith et al.

(10) Patent No.: US 12,353,450 B2
(45) Date of Patent: *Jul. 8, 2025

(54) METHOD AND SYSTEM FOR CONVERSATIONAL INPUT DEVICE WITH INTELLIGENT CROWD-SOURCED OPTIONS

(71) Applicant: Mastercard International Incorporated, Purchase, NY (US)

(72) Inventors: Andrew J. Smith, St. Louis, MO (US); Saravana Perumal Shanmugam, Fremont, CA (US); Adam Kenneth Hosp, Lake St. Louis, MO (US); Ted P. Sanders, Chesterfield, MO (US); Michael K. Forbis, St. Louis, MO (US); Sarala Buradagunta, West Orange, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,906

(22) Filed: Nov. 29, 2022

(65) Prior Publication Data
US 2023/0089001 A1    Mar. 23, 2023

Related U.S. Application Data

(63) Continuation of application No. 15/614,727, filed on Jun. 6, 2017, now Pat. No. 11,537,644.

(51) Int. Cl.
*G06F 16/00* (2019.01)
*G06F 16/242* (2019.01)
(Continued)

(52) U.S. Cl.
CPC ........ *G06F 16/3329* (2019.01); *G06F 16/243* (2019.01); *G06F 16/3322* (2019.01);
(Continued)

(58) Field of Classification Search
CPC .............. G06F 16/3329; G06F 16/243; G06F 16/3322; G06F 16/435; G06Q 10/063; G10L 15/18

See application file for complete search history.

(56) References Cited

U.S. PATENT DOCUMENTS

| 7,216,073 B2 | 5/2007 | Avi et al. |
| 9,501,585 B1 | 11/2016 | Gautam et al. |
| (Continued) | | |

FOREIGN PATENT DOCUMENTS

| CN | 1965319 A | 5/2007 |
| CN | 102549567 A | 7/2012 |
| (Continued) | | |

OTHER PUBLICATIONS

Office Action (First Office Action) issued Jun. 4, 2021, by the State Intellectual Property Office of People's Republic of China in corresponding Chinese Patent Application No. 201810571335.7 and an English Translation of the Office Action, 18 pps.

(Continued)

*Primary Examiner* — Tony Mahmoudi
*Assistant Examiner* — Suman Rajaputra
(74) *Attorney, Agent, or Firm* — Panitch Schwarze Belisario & Nadel LLP

(57) ABSTRACT

A method and system are described that provide responses to natural language queries regarding the performance of a business. The method and system provide for crowd-sourced data to determine natural language query suggestions to transmit to a user, based upon previously submitted questions of the user and/or similar merchants to the user. Natural language query suggestions may be provided as utterances to a keyboard of a merchant user. The merchant user may select one or more suggestions provided. The use of natural language queries and responses allows a merchant without a (Continued)

business intelligence background to obtain business insights easily and accurately assess his performance (e.g., against similar merchants, etc.) without personally identifiable or confidential information of other merchants being compromised.

18 Claims, 11 Drawing Sheets

(51) Int. Cl.
  G06F 16/332       (2019.01)
  G06F 16/3329      (2025.01)
  G06F 16/435       (2019.01)
  G06Q 10/063       (2023.01)
  G10L 15/18        (2013.01)

(52) U.S. Cl.
  CPC ......... *G06F 16/435* (2019.01); *G06Q 10/063* (2013.01); *G10L 15/18* (2013.01)

(56) References Cited

U.S. PATENT DOCUMENTS

| | | | | |
|---|---|---|---|---|
| 9,697,531 | B1* | 7/2017 | Bourget | G06Q 30/0206 |
| 10,345,112 | B2* | 7/2019 | Narasimhan | G01C 21/20 |
| 10,546,001 | B1* | 1/2020 | Nguyen | G06F 40/186 |
| 10,726,501 | B1* | 7/2020 | Ran | G06F 7/24 |
| 11,176,607 | B1* | 11/2021 | Bekmann | G06Q 40/03 |
| 2003/0101060 | A1* | 5/2003 | Bickley | G10L 15/08 |
| | | | | 704/275 |
| 2004/0205176 | A1* | 10/2004 | Ting | H04L 67/306 |
| | | | | 709/223 |
| 2007/0055649 | A1 | 3/2007 | Tsuzuki et al. | |
| 2009/0030787 | A1 | 1/2009 | Pon et al. | |
| 2011/0025516 | A1 | 2/2011 | Johnson et al. | |
| 2013/0073340 | A1 | 3/2013 | Alex et al. | |
| 2013/0226563 | A1 | 8/2013 | Hirate | |
| 2014/0052445 | A1 | 2/2014 | Beckford et al. | |
| 2014/0115456 | A1 | 4/2014 | White et al. | |
| 2014/0244353 | A1* | 8/2014 | Winters | G06Q 20/387 |
| | | | | 705/7.29 |
| 2014/0278351 | A1 | 9/2014 | Clark et al. | |
| 2015/0052115 | A1 | 2/2015 | Sharifi | |
| 2015/0186156 | A1 | 7/2015 | Brown et al. | |
| 2016/0012104 | A1 | 1/2016 | Petrov | |
| 2016/0086222 | A1* | 3/2016 | Kurapati | G06Q 40/08 |
| | | | | 705/14.53 |
| 2016/0092895 | A1 | 3/2016 | Grossman | |
| 2017/0075988 | A1 | 3/2017 | Kadiri et al. | |
| 2017/0148020 | A1 | 5/2017 | Vienravee | |
| 2018/0080784 | A1* | 3/2018 | Narasimhan | G01C 21/3476 |
| 2018/0203924 | A1 | 7/2018 | Agrawal et al. | |

FOREIGN PATENT DOCUMENTS

| | | |
|---|---|---|
| CN | 103631853 A | 3/2014 |
| CN | 103853822 A | 6/2014 |
| CN | 103927299 A | 7/2014 |
| CN | 104662567 A | 5/2015 |
| CN | 104699676 A | 6/2015 |
| CN | 104981799 A | 10/2015 |
| CN | 105659230 A | 6/2016 |

OTHER PUBLICATIONS

Notification of Transmittal of the International Search Report and the Written Opinion of the International Searching Authority issued on Jul. 5, 2018, by the European Patent Office in corresponding International Application No. PCT/US2018/032015, 11 pps.

* cited by examiner

METHOD AND SYSTEM FOR CONVERSATIONAL INPUT DEVICE WITH INTELLIGENT CROWD-SOURCED OPTIONS

This application claims the priority benefit of U.S. Provisional Application No. 62/358,638, "Method and System for Providing Sales Information and Insights through a Conversational Interface" by Andrew J. Smith et al., filed Jul. 6, 2016, which is herein incorporated by reference in its entirety.

FIELD

The present disclosure generally relates to technical methods and systems for performing analytics and distributing advice in natural language format using a conversational interface. The present disclosure relates to methods and systems for automatic querying and reporting of customized analytics, suggesting utterances to a user based upon natural language queries received from multiple users, and machine-learning-based solutions to the distribution of user-specific analytics.

BACKGROUND

Many small businesses and individual merchants either have limited data relating to their business practices, customers, supply chains, and other aspects of their day-to-day operations or possess such data, but do not have a reliable mechanism by which to access that data and implement it to develop useful advice. Transaction data entries and payment transactions that have been cleared and forwarded to payment processors may include valuable information relevant to the optimization of operations at the small business. In addition, other sources of information exist that can help clarify a cause and effect relationship between external conditions and changes in the performance of the small business. Such information may not be readily available to a merchant and/or may not exist in a format in which the merchant can acquire such information.

Merchant-users of payment networks typically have some information stored in a merchant server that may include payments and purchases that have not yet been forwarded to payment processors, or other types of information including customer payment preferences and customer delivery or pickup preferences. Examples of data that may be extracted from such information include market share data. U.S. patent application Ser. No. 14/498,194 entitled "Method and System for Identifying Merchant Market Shares Based on Purchase Data" filed on Sep. 26, 2014 describes one way to obtain market share data from the information available from businesses and is incorporated by reference in its entirety.

Although this corpus of information is being generated by a typical small business, the resources are not ordinarily available for the small business to analyze this information to derive useful information the small business can use to improve their performance. Even if the small business has the resources to analyze this information and derive useful information, the techniques used to derive the useful information are specific to interpreting large volumes of various types of information and may not be within the skills of a typical small business owner. Further, additional information, not readily available to a merchant, may be useful and necessary to providing a comprehensive analysis of the merchant's business practices and determining strategic pathways forward. For instance, data related to merchants other than that merchant, may be necessary to provide a robust analysis of the merchant's business. Such information may be confidential and may not be accessible in a way that protects personally identifiable information.

Small businesses and merchants may not have the time, resources (computational or otherwise), or skillset to analyze the type of data necessary to provide a comprehensive strategic review of their own business practices. Further, even if a merchant had access to data for assessing business development needs, businesses and merchants may spend a vast amount of time developing search terms which may not return the analysis or type of data which is actually being sought. Additionally, such software may not take into account the type of data which similar users are seeking. Further, as a business grows or otherwise develops, the analytical needs of a merchant user may change.

Accordingly, a need exists to provide a technical solution which enables a small business owner or merchant to submit natural language queries and receive comprehensive and relevant analytics. Further, a need exists for a technical solution which takes into account a multitude of information not directly related to a merchant user, develops a comprehensive report, and automatically provides such a report without burdening the user. A need exists which enables a system to provide accurate and customized analytics to merchant or small business owner requests, even where the merchant user fails to accurately identify search terms keyed to the data being sought.

There exists a need to address this technical problem by providing sales information and other insights through a conversational interface so that the small business owner can easily analyze the wealth of available information and derive useful information that can be used to improve the performance of the small business. The conversational interface is of particular use because the small business owner need not know specific terms of art needed to derive useful information and can instead simply submit natural language queries to determine how to improve the performance of their small business. The technical problem is therefore addressed by providing an easy to use interface that allows for actionable information to be extracted from the information generated by a typical business. Additionally, the technical problem is addressed by providing natural language query suggestions and automatic reports to users based upon crowd-sourced data (e.g., of similar merchant users), payment network data, and/or usage data, etc. which may be otherwise unaccessible to a user.

SUMMARY

The present disclosure provides for a method of providing an automatic natural language response, comprising: storing, in a user database, user data entries, each user data entry comprising at least a user identifier and associated user characteristic data; identifying, in the user database, a first user data entry, the first user data entry comprising at least a first user identifier and first user characteristic data; querying, based upon the first user data entry, a query database, wherein the query database stores a plurality of query data entries and the query data entries comprise at least natural language query data and at least one of user identification data and query characteristic data; identifying, in the query database, at least one query data entry having user identification data or query characteristic data similar to data of the first user data entry; retrieving, from the at least one query data entry, natural language query data, the natural language query data being based upon at least one natural language query previously received from at least one user of a plurality of users; determining, based upon the retrieved natural language query data, at least one intent and at least one entity of the at least one natural language query; identifying, based upon the retrieved natural language query data, at least one set of data; retrieving the identified set of data; calculating a response to the at least one natural language query based on the retrieved set of data and the first user identifier using at least one analytical model; automatically generating a natural language response, based on the calculated response, to the at least one natural language query; and one of: storing the natural language response in connection with the first user identifier at a server; or transmitting, to a user device associated with the first user identifier, the natural language response.

The present disclosure further provides for a method of providing intelligent natural language query suggestions comprising: storing, in a user database, user data entries, each user data entry comprising at least a user identifier and associated user characteristic data; identifying, in the user database, a first user data entry; retrieving, from the first user data entry, first user characteristic data; querying, based upon the first user characteristic data, a query database, wherein the query database stores a plurality of query data entries and the query data entries comprise at least natural language query data and query characteristic data; identifying, in the query database, at least one query data entry having characteristic data similar to the first user characteristic data; retrieving, the natural language query data associated with the identified at least one query data entry; and, at least one of: storing, in a first user suggestion database, at least one natural language query suggestion, the at least one natural language query suggestion being based on the retrieved natural language query data, and transmitting, to a user device of a user associated with the first user identifier, a notification comprising the at least one natural language suggestion.

The present disclosure provides for a system for providing an automatic natural language response, comprising: a user database storing user data entries comprising at least a user identifier and associated user characteristic data; a query database storing query data entries comprising at least natural language query data and at least one of user identification data and query characteristic data; and a processing device configured to: identify, in the user database, a first user data entry, the first user data entry comprising at least a first user identifier and first user characteristic data, query, based on the first user data entry, a query database, identify, in the query database, at least one query data entry having user identification data or query characteristic data similar to data of the first user data entry, retrieve, from the at least one query data entry, natural language query data, the natural language query data being based upon at least one natural language query previously received from at least one user of a plurality of users; determine, based upon the retrieved natural language query data, at least one intent and at least one entity of the at least one natural language query, identify, based upon the retrieved natural language query data, at least one set of data, retrieve the identified set of data, calculate a response to the at least one natural language query based on the retrieved set of data and the first user identifier using at least one analytical model, automatically generate a natural language response, based on the calculated response, to the at least one natural language query, and one of: store the natural language response in connection with the first user identifier at a server, or transmit, to a user device associated with the first user identifier, the natural language response.

The present disclosure further provides for A system for providing intelligent natural language query suggestions comprising: a user database storing a plurality of user data entries, each user data entry comprising at least a user identifier and associated user characteristic data; a query database storing a plurality of query data entries, each query data entry comprising at least natural language query data and query characteristic data; a processing device configured to: identify, in the user database, a first user data entry; retrieve, from the first user data entry, first user characteristic data; querying, based upon the first user characteristic data, a query database, identify, in the query database, at least one query data entry having characteristic data similar to the first user characteristic data; retrieve, the natural language query data associated with the identified at least one query data entry; and, at least one of: store, in a first user suggestion database, at least one natural language query suggestion, the at least one natural language query suggestion being based on the retrieved natural language query data, and transmit, to a user device of a user associated with the first user identifier, a notification comprising the at least one natural language suggestion.

BRIEF DESCRIPTION OF THE DRAWING FIGURES

Figure 1:
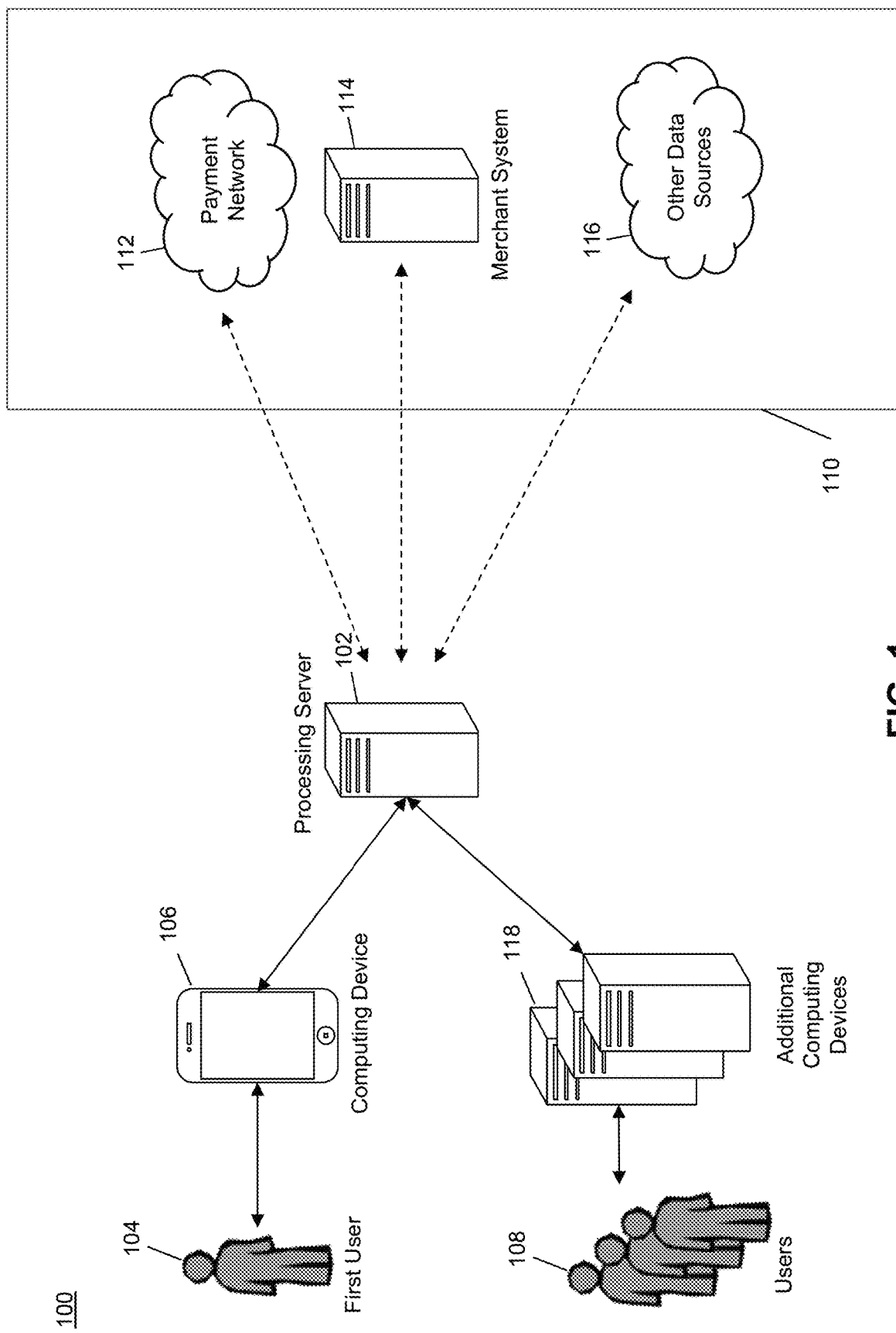
FIG. 1 is a high level architecture illustrating a system for providing sales information and insights through a conversational interface, automatic reporting of analytics and distribution of advice using a conversational interface and distribution of intelligent, crowd-sourced options.

It should be understood that the detailed description of exemplary embodiments are intended for illustration purposes only and are, therefore, not intended to limit the scope of the disclosure.

DETAILED DESCRIPTION OF THE DISCLOSED EMBODIMENTS

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

System for Providing Sales Information and Insights Through a Conversational Interface, Automatic Reporting of Analytics and Distribution of Advice Using a Conversational Interface and Distribution of Intelligent, Crowd-Sourced Options FIG. 1 depicts a system 100 for providing sales information and insights through a conversational interface, automatic reporting of analytics and distribution of advice using a conversational interface and distribution of intelligent, crowd-sourced options. The system 100 includes a processing server 102 that may receive natural language queries and provide natural language suggestions and/or responses to a first user 104 (also referred to herein as merchant 104 or merchant user 104), which may be, e.g., a merchant, via user device 106. For instance, a merchant 104 may enter a natural language query into computing device 106, which may be a smartphone, a tablet computer, a laptop computer, a personal computer, or a similar device (e.g., smart television, wearable device, etc.) that is in communication with the processing server 102. Additional users 108 (also referred to herein as additional merchants 108), e.g., merchants other than merchant 104, may communicate with processing server 102 as well via additional user devices which may be a device similar to the types of devices listed above as acceptable for computing device 106. Communications similar to those between merchant 104 and processing server 102 via computing device 106 may be performed by merchants 108 via additional computing devices 118.

The natural language query enables merchant 104 to interact with the processing server 102 in a conversational manner to obtain various useful responses customized to merchant 104. Similarly, merchants 108 may interact with processing server 102 via additional computing devices 118. The conversational interface via which the merchant 104 and merchants 108 may interact is particularly useful for business owners who are not familiar with the types of analytics that may be performed on sales information. Examples of the conversational manner in which the natural language queries may be structured include, e.g., "What were my sales last Friday?" and "How are my sales this year compared to last year?" Although the queries need not be structured in the same manner as these examples and need not have a specific syntax or pattern, the system 100 contemplated here is able to extract the relevant intents and entities from queries entered by the merchant user 104 through natural language processing. There are a number of ways this natural language processing can be done at a level of detail, such as that disclosed, in U.S. Pat. No. 7,216,073 filed Mar. 13, 2002 and entitled "Dynamic natural language understanding."

The user 104 may be presented with an interface through which they may enter one or more natural language queries. In some embodiments, the interface may be provided via a mobile application running on a user smartphone or similar device. In some embodiments, the user 104 may be presented with a chat interface similar to one that is available through various messaging systems such as Facebook Messenger®, Google Hangouts®, and WeChat®. In some embodiments, the user 104 may be presented with a customized chat interface that is provided on, for example, a web page of a service provider that is providing sales information and insights. For example, the user 104 may access a secured web site and enter natural language queries into a text box. Particularly when utilizing various messaging systems, the user 104 may appear, at the user device, to be interacting with another user of the messaging system, but would actually be interacting with the processing server 102. Entry of a natural language query may occur through the use of a keyboard or other input device, through voice recognition, or through a combination of such input mechanisms. Other types of input may also be used to generate the natural language query. In some embodiments that utilize, for example, voice recognition, the recognition of the voice of the merchant and the translation of the voice into a natural language query occurs at the computing device 106 of user 104. For example, the computing device 106 of user 104 may utilize a keyboard for text entry of a query and the computing device 106 may also present a voice recognition interface for entry of a query. In either instance, the computing device 106 converts the input into a natural language query suitable for the processing server 102 by deriving at least one intent and at least one entity. In the case of a merchant user, an intent may be a performance metric, a comparison metric, a timeframe, a target of the query, etc.

For example, when given a natural language query of "How are my sales trending this month compared to my competition," an intent of the phrase may be "my sales" (target of query), "this month" (timeframe), and "compared to my competition" (measure of performance). In embodiments, intents and entities of natural language queries may be derived by processing server 102 in addition to or instead of by computing device 106. Such queries may be derived in a similar manner as that described in connection with the computing device 106.

Associated with the natural language query is a user identifier that is associated with the user 104. The user identifier may be a merchant identifier. The user or merchant identifier is used by the processing server 102 to retrieve the appropriate information from relevant databases, such as transaction database 210 and other databases (e.g., a payment database (not pictured), etc.). By using the merchant identifier, the processing server 102 is able to return a natural language response to user 104 (e.g., via computing device 106) specifically tailored to only reveal information to which the user 104 is entitled. For example, by associating a merchant identifier of a user 104 with a natural language query submitted by user 104, the user 104 may be prevented from receiving a response to a query such as "How were my competitor ACME Co.'s sales last week?," by processing server 102. This feature prevents the exposure of confidential information of merchants other than user 104 (e.g., such as users 108). The processing server 102 may however accept certain queries where the natural language response to such queries includes information that cannot be directly attributed to a specific competitor. Examples of such natural language queries may be those such as "How are my sales trending this month compared to my competition?" or "How are my sales on Tuesdays compared to similar small businesses in Anytown, USA."

Using the intent and entity derived from a natural language query along with the merchant identifier, the processing server 102 may retrieve a plurality of transaction data entries 212 from the transaction database 210 where each of the transaction data entry 212 includes transaction data associated with a payment transaction from the payment database (not pictured) for the merchant user 104. This type of information may typically be found, for example, within a payment processor that handles payments between merchants such as user 104 and consumers who conduct business with the merchant user 104. The processing server 102 may request this information from the transaction database 210 and the payment database (not pictured) by using the merchant identifier received with the natural language query. This helps ensure the generated natural language response, in response to the natural language query received from user 104, only includes the information to which the merchant user 104 is entitled. More specifically, when retrieving a plurality of transaction data entries 212 from the transaction database 210 of a payment processor including transaction data associated with a payment transaction from a payment database of a payment processor, information associated with another merchant identifier (other than that of merchant user 104) will not be made available to the processing server 102 or transmitted to computing device 106. By preventing such availability, the confidentiality of other merchants and the confidentiality of the information of the other merchants, such as users 108, is ensured. Other techniques may be employed to further ensure a merchant cannot directly access the information of other merchants. The information of other merchants may, however, be provided by the processing server 102 in an aggregated and/or anonymized manner.

Using the intent and entity derived from a natural language query, the processing server 102 may also access additional databases from memory 222 available to the processing server 102 to expand the number and type of queries to which the processing server 102 may respond. Additionally, processing server 102 may access external data sources 110 including payment networks 112, merchant systems 114, and other data sources 116 available to the processing server 102 to address natural language queries received from users, such as user 104. Such additional databases of memory 222 or additional external data sources 110 are accessed when the natural language query received from a user 104 provides an intent or entity to which such additional databases or external data sources 110 can provide information responsible to the natural language query.

The additional databases of memory 222 or of external data sources 110 may contain information that is proprietary, confidential or otherwise not freely available for public consumption. Embodiments where the processing server 102 includes the additional databases may periodically receive updates to the database from a data provider or otherwise receive updates to the information contained in the additional databases of memory 222. In some other embodiments, the processing server 102 securely accesses the information from additional databases that are not contained within the processing server 102. In such an embodiment, the information from additional database may be received by the processing server 102 by way of the receiving device 202. Additional databases of memory 222 or external sources 110 described in this example may comprise confidential information or information that is to be anonymized. Protections to ensure the confidentiality of other users, merchants and other individuals and the confidentiality of the information of the other users, merchants and individuals are employed when these types of additional databases are utilized, but as discussed above, such information may be provided in an aggregated and anonymized manner.

Using the intent and entity derived from one or more natural language queries received from user 104, the processing server 102 may access external data sources 110 including payment networks 112, merchant systems 114, and other data sources 116 available to the processing server 102. Such external data sources 110 are accessed when the natural language query or queries include an intent or entity where the external data sources 110 can provide relevant information. For example, a natural language query such as "Are my sales affected by rain?" may cause the processing server 102 to access other data sources 116 such as a publicly available weather database. Although the external data source 110 described in this example does not require the merchant identifier, the system and method 100 described here also contemplates external data sources 110 which require the user or merchant identifier, or information related to a user or merchant identifier, to return relevant data to the processing server 102. When a user or merchant identifier is needed to access external data sources 110, similar protections to ensure the confidentiality of other merchants and the confidentiality of the information of the other merchants may be implemented as discussed above (e.g., it may be aggregated or reported in an anonymized manner).

By configuring processing server 102 to access additional databases in memory 222 and external data sources 110, the system and method 100 disclosed herein is capable of providing a comprehensive natural language response to one or more natural language queries received from a user 104. For example, a natural language query such as "What is the average income for my customer base?" may cause the processing server 102 to access additional databases of memory 222 or external data sources 110 so that sufficient information is collected to provide an appropriate natural language response to the inquiry. For example, processing server 102 may receive the natural language query "What is the average income for my customer base?" and may determine an intent of "average incomes" and an entity of customers related to merchant user 104. Processing server 102 may, based upon the derived intent and entity, access an additional database of memory 222 or an external source 110 to retrieve average income information associated with, e.g., street addresses, zip codes, etc. and compare this information to customer base information related to merchant user 104 to generate an accurate response to the natural language query.

In another example, processing server 102 may access merchant system 114 to obtain information not available or not yet available to other sources, such as payment networks 112 or a payment database (not shown) of processing server 102. For example, merchant user 104 may use merchant accounting software on merchant system 114 to store information from sales which is not to be transmitted or has not yet been transmitted to payment networks 112 (or any other external device, such as processing server 102). For example, merchant system 114 may store information such as customer payment preferences, customer delivery or pickup preferences, customer items purchased, etc. The processing server 102 may access this information from merchant system 114 by using standard access techniques such as an application programming interface (API). Thus, merchant user 104 may format natural language queries which must take into account data residing only at merchant device 106 and/or merchant system 114 (e.g., such as merchant accounting software 114 of merchant system 114). For example, a natural language query of a merchant user 104 could be "How many of my customers prefer to prepay before we render our services?"

The processing server 102 may identify a set of transaction data entries 212, if necessary, and/or additional data from external data sources 110 or memory 222. Processing server 102 relies upon one or more derived intent and/or entity to identify relevant data sets (e.g., transaction data entries 212 and data from external data sources 110, etc.). By identifying sets of data, processing server 102 reduces the amount of information which must be processed to calculate a response to the natural language query based on transaction data entries using at least one analytical model. To generate the response, at least one analytical model is employed to process the sets of information by performing calculations on the sets of information to derive useful information.

To provide a response to user 104 in a conversational manner, a natural language response may be generated from the response by processing server 102. The natural language response may be provided to user 104 in a manner similar to how the natural language query was received. The interface through which the user 104 entered the natural language query may be used to provide the natural language response. In some embodiments, the natural language response may be provided to user 104 in a periodic manner or delayed manner. An alternate interface may be implemented to provide such responses, e.g., as pre-specified by a user 104.

In some instances, natural language queries may be received by processing server 102 which comprise a triggering threshold. For example, a query may be received by processing server 102 such as "Send me a message if today's sales are 20% lower than historical values." With such a natural language query 106, the processing server 102 is configured to monitor relevant databases and/or data sources so that if and when the triggering threshold is met, a natural language response may be transmitted to user 104.

In some instances, a merchant user 104 may submit a natural language query by interacting, e.g., with a Google Hangouts bot. The query may require consideration of a substantial amount of information. Accordingly, based upon preselected user preferences or in response to a request transmitted by processing server 102 to user 104, the user may approve receipt of a natural language response by way of an alternative interface (e.g., an SMS message, a push notification to an application of the user device 106, etc.). In another example, a merchant user 104 may submit a natural language query using Google Hangouts asking "Send me a text message if today's sales are 20% lower than historical values." Regardless of the interface used or manner in which the natural language response is transmitted to merchant user 104, the response is transmitted in such a way that the user 104 may receive and review the response (e.g., at user device 106) in a natural language format, without the need to further interpret the received response. In some embodiments, a response may be provided to user 104 by telephone call (e.g., a voice call to device 106 or another device associated with user 104, etc.).

The natural language response transmitted to and received by the user 104 may include audio, graphical, textual, or other types of information the system 100 considers useful for understanding the calculated response. For example, the calculated response may be a sales increase per year derived from transaction data entries. With such a calculated response, the natural language response may include a graphical representation of the annual sales increase derived from transaction data entries so that consideration by the merchant user 104 may be facilitated.

In at least some situations, merchant user 104 may desire to understand reasons that a natural language response was provided in response to the natural language query. When merchant 104 provides a natural language query that seeks reasons as to how or why the response was generated, system 100 may provide reasoning contained in analytical models used to calculate the response upon which the natural language response to user 104 was based.

In some instances system 100 may be configured to provide a merchant 104 with a natural language response without first being prompted by merchant 104 For instance, computing device 106 and/or processing server 102, may be configured to silently ask questions relevant to merchant 104 and generate responses which may be provided to merchant 104 in natural language form. Such automatic responses may be provided, e.g., at certain times, upon the occurrence of one or more events, upon an action of one or more merchants 108 (e.g., based upon a similar merchant to 104 submitting a query), etc. Such automatic responses may be determined based upon a number of factors, e.g., questions previously asked by merchant 104, questions asked by other merchants 108 of system 100, questions related to questions which have been previously asked by merchant 104, etc. For instance, processing server 102 may receive a question from one or more of merchants 108 via one or more additional computing devices 118. Processing server 102 may analyze the question along with the merchant identifiers received from the one or more merchants 108 to determine merchants similar to user 104. Processing server 102 may, e.g., determine natural language queries most frequently asked by merchants similar to user 104 and may, e.g., once a day, once a week, etc. generate a response to the natural language queries specific to user 104. Processing server 102 may compile responses to multiple natural language queries into a report, comprising natural language responses based upon the compiled responses.

In some instances, system 100 may be configured to provide intelligent, customized natural language query suggestions to a user 104. The natural language queries may be based upon, e.g., natural language queries previously submitted by user 104, natural language queries previously submitted by users 108, default natural language queries, or any combination thereof. The processing server 102 may transmit a query to computing device 106 which may be, e.g., displayed to user 104 on a prepopulated keyboard of an application running on computing device 106. The natural language query suggestion may be transmitted from time-to-time, based upon a prescheduled time, based upon one or more triggering events, in response to an initial natural language query submitted by user 104, etc. The user 104 may select, from the displayed (or otherwise provided) natural language query suggestion, one or more natural language query suggestions. The user-selected query suggestion may then be processed similarly to a natural language query input by user 104, as discussed above and throughout this disclosure. In embodiments, the user-selected query suggestion may be processed more quickly than when a natural language query is received as the processing server 102 may be able to quickly identify the at least one intent and at least one entity associated with the user-selected query suggestion based upon previously stored data.

For instance, processing server 102 may determine that merchants similar to first user 104 have asked questions such as "How can I boost profit on Sunday?" processing server 102 may have processed the natural language query "How can I boost profit on Sunday" to determine an intent and/or entity. This query may be stored in connection with the determined intent and/or entity. For instance, "boost profit" may be determined as a target of the query and "Sunday" may be the time frame. The processing server 102 may substitute the time frame based upon a relevancy calculation. For example, the question of "How can I boost profit on Sunday?" may be asked most commonly on Saturday. In embodiments, the server may identify this query as being relevant to user 104 on a Tuesday and thus, substitute "Sunday" for "Wednesday" and transmit "How can I boost profit on Wednesday?" as a suggested query to user 104. If user 104 selects this query as one to which a response is requested, processing server 102 may receive the natural language query and determine the intent and entity without needing to process the natural language query (e.g., based on previously stored data).

Using the user identifier 104 and query intent data, processing server 102 may determine what type of data is necessary to respond to the query. For instance, formulating a response to "How can I boost profit on Sunday?" may involve assessing similar merchants (e.g., similar in size, location, industry, etc.) to determine which merchants have higher sales than user 104. Such an assessment may involve communicating with one or more external devices (e.g., a payment network or one or more merchant systems, etc.). For each merchant, additional data may be determined (e.g., hours of business, etc.) by communicating with external devices, internet searches, and/or from databases stored at processing server 102.

Processing Server

Figure 2:
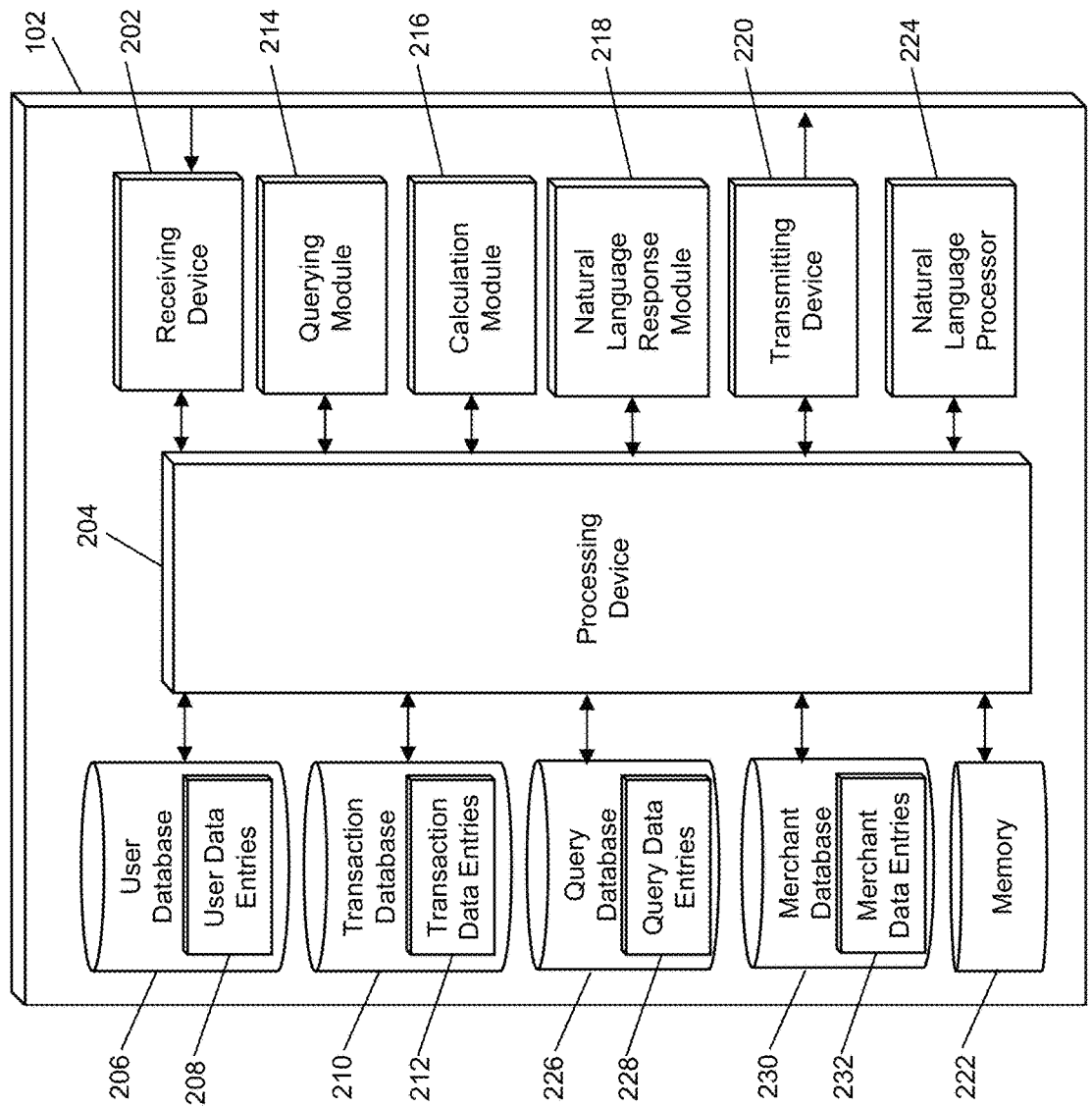
FIG. 2 is a block diagram illustrating a processing server such as that depicted in FIG. 1.

FIG. 2 illustrates an embodiment of a processing server 102 in the system 100. It will be apparent to persons having skill in the relevant art that the embodiment of processing server 102 illustrated in FIG. 2 is provided as illustration only and may not be exhaustive to all possible configurations of processing server 102 suitable for performing the functions as discussed herein. For example, the computer system 1100 illustrated in FIG. 11 and discussed in more detail below may be a suitable configuration of processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 116 for the transmission of transaction messages that include sensitive financial data and information. In some instances, the receiving device 202 may also be configured to receive data from external sources 110, merchant systems 114, and other data sources 116 (e.g., computing systems and entities) via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices, such as 106 and 118, of merchants 104 and 108, respectively. For example, natural language queries may be received by receiving device 202. These may include, for example, the textual equivalent of the actual query presented by a merchant 104, a preprocessed equivalent of the actual query presented by merchant 104, or a combination thereof. In some embodiments, the natural language query may include data indicating at least one intent and at least one entity. In some embodiments, the natural language query may include data needing additional processing to derive at least one intent and at least one entity associated therewith. The receiving device 202 may also be configured to receive data signals electronically transmitted by data providers for the information contained in additional databases of memory 222, external data sources 110, such as one or more payment networks 112, merchant systems 114, and, e.g., publicly available data from other data sources 116, sources such as historical weather reports, geographical information, phonebook information, etc. In some embodiments, the receiving device 202 may be further configured to receive data for storage in the processing server 102, as discussed in more detail below, such as the received natural language query from computing device 106, previously retrieved data from external data sources 110 that need not be refreshed, and other information received by the processing server 102.

Processing server 102 may also include a processing device 204. Processing device 204 may comprise a communication module (not shown). The communication module may be configured to transmit data between modules, engines, databases, memories, and other components of the processing server 102 for use in performing the functions discussed herein. The communication module may be comprised of one or more communication types and utilize various communication methods for communications within a computing device. For example, the communication module may be comprised of a bus, contact pin connectors, wires, etc. In some embodiments, the communication module may also be configured to communicate between internal components of the processing server 102 and external components of the processing server 102, such as externally connected databases, display devices, input devices, etc.

The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, calculation module 216, response generation module 218, and natural language processor 224. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a querying module 214. The querying module 214 may be configured to execute queries on databases 206, 210, 226, 230 and/or other databases, such as those stored in memory 222, to identify sets of information. The querying module 214 may retrieve and/or identify a plurality of data entries or a set of the plurality of data entries that satisfy certain criteria to reduce the amount of data that must be considered when calculating a response. The querying module 214 may receive one or more data values or query strings and may execute a query string based thereon on an indicated database to identify relevant information stored therein. The querying module 214 may then output identified sets of information to an appropriate engine or module of the processing server 102 as necessary. Querying module 214 may, for example, execute a query on user database 206, to identify a user data entry 208. The user data entry 208 may be used by querying module 214 to identify a set of transaction data entries relevant to the user data entry 208. The querying module 214 may be configured to monitor one or more databases of processing server 102 for specific trends or transactions. For example, the querying module 214 may monitor database 210 to determine if sales for a particular day are lower than historical sales. Querying module 214 may utilize the at least one intent and at least one entity obtained from a natural language query to execute one or more queries on one or more databases of processing server 102.

Querying module 214 may also execute queries on external data sources 110 and additional databases of memory 222. To do so, querying module 214 may employ an appropriate API to obtain desired information from the external data sources 110 and additional databases. The querying module 214 may retrieve a plurality of data entries and identify a set thereof which satisfies certain criteria to reduce an amount of data which must be considered when calculating a response. Certain external data sources 110 and additional databases of memory 222 relevant to a query may comprise information to which a user 104 for which a natural language response is being generated may not be entitled. For example, payment network 112 may provide access to payment transactions based upon a geographical location. Such payment transactions may include merchant identifiers and/or consumer identifiers. The querying module may be configured to modify such data to ensure user merchant 104 only obtains information to which it is entitled.

The processing server 102 may also include a calculation module 216. The calculation module 216 may be configured to perform determinations for the processing server 102 for performing the functions discussed herein. The calculation module 216 may receive instructions as input, may perform determinations based on the instructions, and output a result of the calculation in accordance with an analytical model to another module or engine of the processing server 102. In some instances, the calculation module 216 may receive data for use in the calculation as input. In other instances, the calculation module 216 may be configured to obtain data for use in calculations, such as by instructing the querying module 214 to perform corresponding queries. The calculation module 216 may be configured to calculate, in accordance with an analytical model, useful information responsive to the natural language query 106. Multiple analytical models performing in an ensemble may also be used by the calculation module 216 to perform calculations responsive to the natural language query 106. In some embodiments, the calculation module 216 may execute calculations to identify specific trends or transactions. For example, the calculation module 216 may execute calculations to determine if the day's sales are lower than historical sales.

The processing server 102 also includes a natural language response module 218. The natural language response module 218 generates a natural language response 108 based on the result of the calculation by the calculation module 216. The natural language response 108 is a conversational response to the natural language query 106 by the merchant 104. In some embodiments, based on the natural language query 106 by the merchant 104, the queries made by the querying module 214, and the calculations made by the calculating module 216, the natural language response module 218 generates a natural language response to be provided to the merchant 104.

The natural language response generated by the natural language response module 218 may include audio, graphical, textual, or other types of information considered useful for facilitating the understanding of the merchant 104 of the calculated response. For example, the calculated response may result be a sales increase per year derived from transaction data entries. With such a calculated response, the natural language response generated by the natural language response module 218 may include a graphical representation of the annual sales increase derived from transaction data entries so that consideration by the merchant 104 may be facilitated.

When a natural language query from the merchant 104 seeks the reasons why a natural language response was provided, the processing server 102 provides the merchant 104 with the analytical models used by the calculation module 216 so that the merchant 104 can have an improved understanding as to why the natural language response was provided. In some embodiments, the calculation module 216 logs, e.g., in the query database 226, an indication that a query seeking an explanation of a natural language response was received in association with the natural language query upon which the response was generated.

The processing server 102 may also include a transmitting device 220. The transmitting device 220 may be configured to transmit data over one or more networks via one or more network protocols. In some embodiments, the transmitting device 220 may be configured to transmit data over the payment rails, such as using specially configured infrastructure associated with payment networks 116 for the transmission of transaction messages that include sensitive financial data and information, such as identified payment credentials. In some instances, the transmitting device 220 may be configured to transmit data to computing devices being used by merchants 104 and external data sources 110 such as payment networks 112, merchant systems 114, and other data sources 116. In some embodiments, the transmitting device 220 may be comprised of multiple devices, such as different transmitting devices for transmitting data over different networks, such as a first transmitting device for transmitting data over the payment rails and a second transmitting device for transmitting data over the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

Processing server 102 may also include a memory 222. The memory 222 may be configured to store data for use by the processing server 102 in performing the functions discussed herein. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 222 may be comprised of or may otherwise include a relational database that utilizes structured query language for the storage, identification, modifying, updating, accessing, etc. of structured data sets stored therein.

A natural language processor 224 may be utilized by the processing server 102 to process a natural language query and derive at least one intent and at least one entity from the query. In some embodiments, the natural language query may be received by the processing server 102 through the receiving device 202. In other embodiments, the natural language query may be identified from a database, e.g., the query database 226. Where the natural language query is received, it may be received from a merchant 104 or other merchants 108. In some embodiments, the natural language processor 224 may be a computer or a network of computers dedicated to natural language processing. In such embodiments, the computer or network of computers dedicated to natural language processing communicate with the processing server 102 to serve the function of the natural language processor 224 depicted in FIG. 2. The natural language processor 224 uses general learning algorithms that may be grounded in statistical inferences to automatically learn language rules through the analysis of a corpus of prior interactions. Multiple classes of machine learning algorithms may be employed including decision trees and probabilistic decision models using real-valued weights so that a relative certainty as to the intended meaning of a natural language query may be derived. In some embodiments, the natural language processor 224 uses feedback from the merchant 104 or merchants 108 to improve its processing of future natural language queries. In still further embodiments, input may be provided directly to processing device 102 based upon a review of the interactions between the merchant 104 and the system 100 to improve the processing of future natural language queries 106 by the natural language processor 224. In some embodiments, the general learning algorithms are combined with hard coded sets of rules to further improve processing of the query.

Regardless of the specific algorithm or combination of algorithms employed, the natural language processor 224 is configured to extract at least one intent and at least one entity from the natural language query. The natural language processor 224 provides such intent and entity information to, for example, the querying module 214, calculation module 216, and the natural language response module 218. Such information provided by the natural language processor 224 provides the information needed for the other modules 214, 216, 218 need to perform their functions. The natural language processor 224 may additionally, or alternatively, cause the extracted intent and entity information to be stored, e.g., such as in query database 226 as a query data entry 228.

As discussed above, processing server 102 may comprise multiple databases, such as user database 206, storing user data entries 208, transaction database 210, storing transaction data entries 212, query database 226 storing query data entries 228, and merchant database 230, storing merchant data entries 232. Additional databases may be stored in memory 222.

User database may store user information for users of system 100. User data entries 208 of user database may comprise, e.g., a user identifier and user authentication data. In some embodiments, user database may further comprise a merchant identifier (which may or may not be associated with the user to which the user identifier is associated), profile information, user characteristic data, and/or usage data, etc.

In instances where user data entries 208 store merchant identifiers, the merchant identifier associated with a user data entry 208 may be implemented to query a merchant database 230 for a corresponding merchant data entry 232, based upon the merchant identifier. In such instances, the merchant data entry 232 may provide characteristics of a merchant who is the same as, or a different merchant, from a user associated with the user identifier of the user data entry. The merchant data entry may provide merchant characteristic data (e.g., a geographic location, a size, historical transaction statistics, sales information, categories of sales information, etc.). In some instances, merchant data entries may comprise multiple merchant identifiers and may be clustered based on one or more merchant characteristics. E.g., merchant database 230 may store, in a merchant data entry, merchant identifiers corresponding to merchants having 1-50 employees and conducting between $250,000 and $300,000 of sales per year, etc. In some instances, merchant data entries may comprise one or more merchant identifiers as well as a value which identifies a cluster to which the merchant data entry belongs. In embodiments data stored in the merchant database 230 and user database 206 may be combined in a single database. In embodiments, multiple databases may comprise the merchant database 230 and/or the user database 206.

The query database 226 may comprise query data entries 228. The query data entries 228 may correspond to one or several users (e.g., user 104, users 108). For instance, each query data entry may comprise one or more user identifiers, merchant identifiers, or characteristic data corresponding to one or more users. The query data entries may comprise data related to a natural language query received from a single user or multiple users. The query data entries 228 may store, e.g., text of a natural language query. In embodiments, natural language query text may be stored in association with at least one intent and/or at least one entity. For instance, the natural language query text may have been previously received from a user of system 100, processed to determine at least one intent and at least one entity, and the at least one intent and at least one entity may be stored in a query data entry (e.g., along with one or more natural language queries from which the at least one intent and at least one entity were derived. In embodiments, the system 100 may receive a plurality of natural language queries from merchants 108. The queries may be processed to determine whether identical or similar queries are submitted and/or whether similar merchants are submitting queries (e.g., by referencing merchant database, etc.). In some embodiments, a query data entry may be created or updated to include a query when the natural language query has been received from a number of merchants (e.g., 3 merchants must ask an identical query prior to the query being included in query database, etc.). In some embodiments, a query data entry may be created or updated to include a query where similar merchants have asked an identical (or similar) query. In some embodiments, a query data entry may be updated or created based upon the receipt of multiple queries having similar intent and/or entity data. In some embodiments, queries having similar entity and/or intent data to previously asked queries may logged and the query comprising the natural language query most often submitted may be flagged as more relevant than other queries.

In some instances, the query data entries 228 may store a question and metrics associated with a merchant who submitted the question. In some embodiments, the query data entries 228 may include both the natural language text submitted by the merchant and processed data derived from the natural language text (e.g., one or more intents and/or entities). In some instances, the query data entries will include dynamic data (e.g., that may be keyed to a merchant or user) and static data (e.g., data that will not change based on the user). For instance, a query data entry may include data specifying that a comparison must be made based upon sales data; however, the sales data may depend on a user identifier for which the query data entry is identified.

In some instances, prior to logging queries in query database 226, natural language queries may be verified to ensure that they are not profane, off-topic or inappropriate. In some instances, such verification may take place in addition to determining how many times a question or similar question has been submitted prior to logging the question in the query database 226.

In some instances, the query data entries 228 may store groups of natural language queries having similar intents and/or entities associated therewith. In some instances, the query data entries may store natural language queries in association with merchant identifiers, user identifiers, merchant cluster values, etc. In some instances, query data entries 228 may be associated with other query data entries based on a similarity score included in each query data entry (e.g., query data entries may be clustered based upon one or more pieces of data stored therein). In embodiments, query data entries may be associated with a number of times the query or a similar query has been asked by one or more users of system 100. Various other query data may be stored in query data entries 228 as discussed throughout this disclosure.

Processing server 102 may, from time to time, assess queries from the query database 226 and determine those which may be relevant to a user (e.g., first user 104). The identified queries may be stored in association with first user 104 (or a group of users). In embodiments, processing server 102 may automatically generate a report based on the queries. In embodiments, processing server 102 may transmit, e.g., via transmitting device 220, the queries to first user 104, as query suggestions and receive feedback from user selecting one or more of the transmitted query suggestions. In such embodiments, processing server 102 may log the response (e.g., by updating a query data entry, creating a new query data entry, by updating a user data entry, etc.) in connection with the query suggestion and/or a user identifier of first user 104. In this way, the processing server 102 can learn from the received user-selected suggestions to identify the most relevant queries for a user 104 (or group of users 108, or similar users to user 104, etc.). The feedback received and logged by the processing server may be implemented, e.g., in automatic reporting processes such as those discussed herein.

The feedback received and logged by the processing server (e.g., as user-selected queries) may be implemented, e.g., in automatic reporting processes such as those discussed herein. Without any action necessary from the user, periodically processing server 102 can query the query database 228 to determine questions which may be relevant to a user (e.g., user 104). For instance, the processing server 102 may implement a matching algorithm to match user characteristics, a user identifier, queries asked by user 104, etc. to data entries having user characteristics, the user identifier, or similar queries (e.g., similar intent/entity, similar natural language text, etc.) to determine relevant queries for user 104. The processing server 102 may then apply the queries identified to user 104 for which the report is to be generated. For instance, the processing server may identify a user identifier associated with user 104, and using the user identifier and the identified queries, the processing server 102 may communicate with a payment network 112, a merchant system 114, etc. The processing server 102 may be configured to communicate securely and quickly with these systems (e.g., by certain protocols discussed herein).

Processing server 102 may receive data related to the merchant user 104 and/or other merchants (e.g., from the payment network 112 and/or merchant computer systems 114). The data may be implemented to formulate responses to the queries. Multiple queries may be answered automatically by the processing server 102 and compiled into a report (e.g., a business report). The auto-generated report may then be stored at the server, waiting for user 104 to access the system. When merchant user 104 opens up the interface, it can see or listen to the auto-generated report. Alternatively, the report could be pushed to a user via a push notification, a text, audio file, e-mail, etc.

In some instances, details may be reported back to the processing server 102 related to the relevancy of the auto-generated report. User feedback may be actively transmitted (e.g., by a user responding by clicking a yes or no button in response to a displayed notification "Is this relevant?"). User feedback may be passive (i.e., may not require the user to actively respond to a relevancy inquiry). For instance, a total time associated with a user viewing the report may be transmitted from, e.g., computing device 106 to processing device 102. The responses may be logged in association with the user 104, the queries asked, etc. to facilitate machine-learning of relevant questions for one or several users.

The processing server 102 may receive feedback responses and update various databases accordingly. Machine-learning may be implemented to determine which answers to suggested queries (or automatically-generated reports) were opened, listened to, or read. These determinations may be fed back into the system (e.g., by updating one or more databases) to be used in similar query relevancy identification processes described herein.

Figure 3:
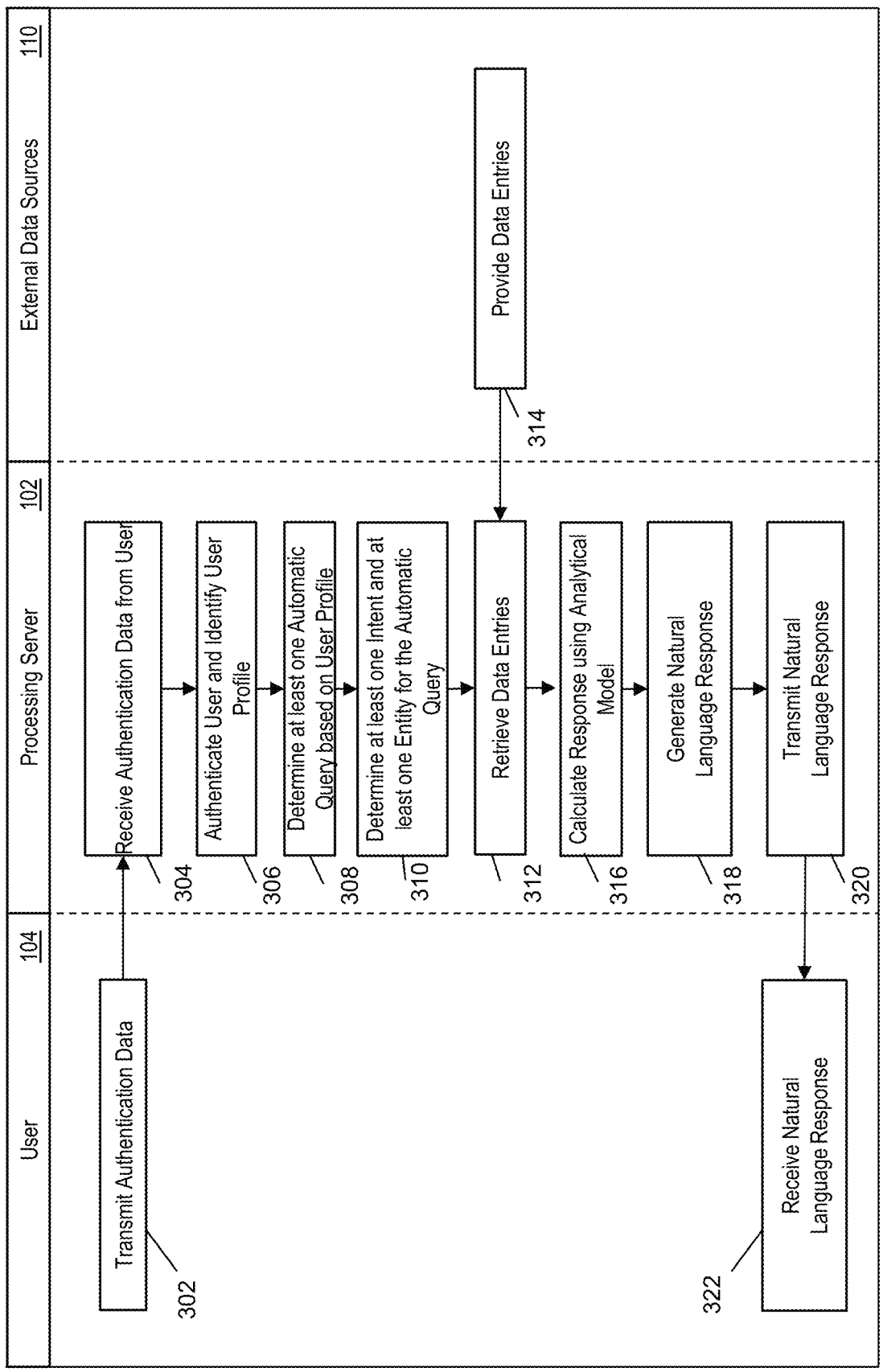
FIG. 3 depicts a method for automatic reporting of analytics and distribution of advice using a conversational interface.

Method for Providing Sales Information and Insights Through a Conversational Interface FIG. 3 depicts a method for automatic reporting of analytics and distribution of advice using a conversational interface.

At step 302, a merchant or user 104 may transmit authentication data to processing server 102. For instance, a merchant 104 may enter login credentials to an application running on computing device 106 (e.g., a personal smartphone, etc.). Alternatively, login credentials may be submitted via a webpage or by any other mechanism which would be apparent to those skilled in the art in light of the present disclosure. At step 304, processing server 102 may receive authentication data from user 104 and may, based upon the authentication data, authenticate the user 104 in step 306. The processing server 102 may identify a user profile or user information based on the authentication data. For instance, processing server 102 may identify, in a database, such as user database 206, a user data entry 208 of a user corresponding to user 104.

In step 308, processing server 102 may determine at least one automatic query based on a user profile corresponding to user 104. In the embodiment of FIG. 3, step 308 may be performed in response to and/or based upon the authentication of user 104. In other embodiments, step 308 may occur on the basis of a triggering event, at a prescheduled time, in response to a message received from a user application that the application has been opened, etc. For instance, an automatic query process may be triggered to begin every evening at the close of a business associated with user 104. The triggering event may be preset by user 104, an administrator of system 100, may be based upon data corresponding to usage patterns of user 104 or other users 108, etc. For instance, processing server 102 may detect times at which a user opens his or her application (or logs into the server), e.g., to request business analytics. Processing server 102 may log this data in connection with the user identifier of user 104 and create a triggering event on that basis. For instance, if a user opens his or her application (or logs into a server) each weekday afternoon around 3 p.m., processing server 102 may log these events and determine if a triggering threshold has been met. For instance, processing server 102 may determine that, if a user is opens his or her application at a similar time for more than three days a week for two consecutive weeks, a process should be created to run at that time every day (or every weekday, every other day, etc.).

In step 308, an automatic query may be determined, e.g., by querying query database 226 to determine whether any query data entries therein are associated with a user identifier of the user 104 (e.g., as identified within user data entry 208). In some embodiments, queries may be stored in the user data entry 208 or in another database in connection with a user identifier of user 104. In some embodiments, step 308 may be performed by querying query database 226 on the basis of characteristic data associated with user 104. For instance, user characteristic data such as a store location associated with merchant user 104 may be retrieved from user data entry 208 associated with user 104 and a query may be run on query database 226 to determine merchants having similar locations to merchant user 104.

In some embodiments, a user identifier associated with merchant user 104 may be implemented to determine a merchant identifier associated with the user 104 or another merchant (e.g., such as users 108) by querying a merchant database 230 (e.g., on the basis of user identifier and/or user characteristics). Merchant database may provide, e.g., merchant identifiers of similar merchants to merchant user 104, a value or values representative of merchants having characteristics similar to user 104, etc. In such embodiments, data retrieved from merchant database 230 may be implemented to query the query database 226 to determine queries relevant to user 104.

In step 308, processing server 102 may determine that one or more queries exist which are relevant to user 104. In step 310, processing server 102 may identify an intent and entity associated with the determined queries. In some embodiments, query database stores intent and entity data along with query data related to a natural language query (e.g., in query data entries 228). In some embodiments, processing server 102 identifies a natural language query and derives at least one entity and at least one intent associated therewith.

In step 312, processing server 102 may identify and retrieve data necessary to respond to the query (e.g., by requesting necessary data from external devices, by communicating with identified software via an API, etc.). For example, when a query is identified of "How are my sales trending this month compared to my competition," an intent of the phrase may be "my sales" (target of query), "this month" (timeframe), and "compared to my competition" (measure of performance). Processing server 102 may determine in data entries necessary to respond to this query (e.g., transaction data of sales at merchant 104, transaction data related to one or more merchants similar to merchant 104, etc.).

At step 314, data entries relevant to responding to the determined query or queries may be provided to processing server, e.g., from an external data source 110. In some instances, data entries relevant to responding to the determined query may be available at processing server 102 (e.g., in databases which are updated from time-to-time based upon payment network data, retrieved by polling payment network 112 at predetermined times, etc.). In some instances, such data may be retrieved from merchant systems (e.g., merchant computing systems storing loyalty data, consumer preferences, etc.). Steps 308 through 314 may execute sequentially, in parallel with each other, or in an order different from that depicted in FIG. 3. Steps may additionally be included which narrow down the retrieved data entries to a subset of data relevant to answering the at least one determined query.

In step 318, processing server 102 may calculate response using the calculation module 216 based on the set of data entries that corresponds to the derived intent and entity. The calculated response may be made based on at least one analytical model. Multiple analytical models performing in an ensemble may also be used by the calculation module 216 to perform calculations responsive to the natural language query 106. In some embodiments, the calculation module 216 may execute calculations to identify specific trends or transactions. For example, the calculation module 216 may execute calculations to determine if the day's sales are lower than historical sales.

In step 316, processing server 102 may generate a natural language response based on the response calculated in step 316. The natural language response may include audio, graphical, textual, or other types of information the system 100 considers useful for understanding the calculated response. For example, the calculated response may be a discrete sales increase per year derived from transaction data entries (e.g., 5% sales increase in year 1, 3% sales increase in year 2, etc.) in response to a determined query such as "How am I doing this year?" or "How are my sales this year?"

With such a calculated response, in step 318, the natural language response generated by the natural language response module 218 may include a graphical representation of annual sales increase derived from transaction data entries so that consideration by merchant user 104 may be facilitated. When the queries to which natural language responses are automatically generated are followed by additional questions from merchant user 104 (e.g., merchant user 104 seeks reasons why a natural language response was provided), merchant 104 may be provided with additional detail (e.g., the analytical model or portions thereof) so that merchant 104 can have an improved understanding as to why the natural language response was provided.

In step 320, the natural language response is transmitted to the computing device being used by the merchant 104 (e.g., computing device 106). In step 322, computing device 106 (or some other computing device being used by user 104) may receive the natural language response. The response may be provided to user in the form of a display, an audio file (e.g., which may automatically play or may play upon a user command), etc.

Figure 4:
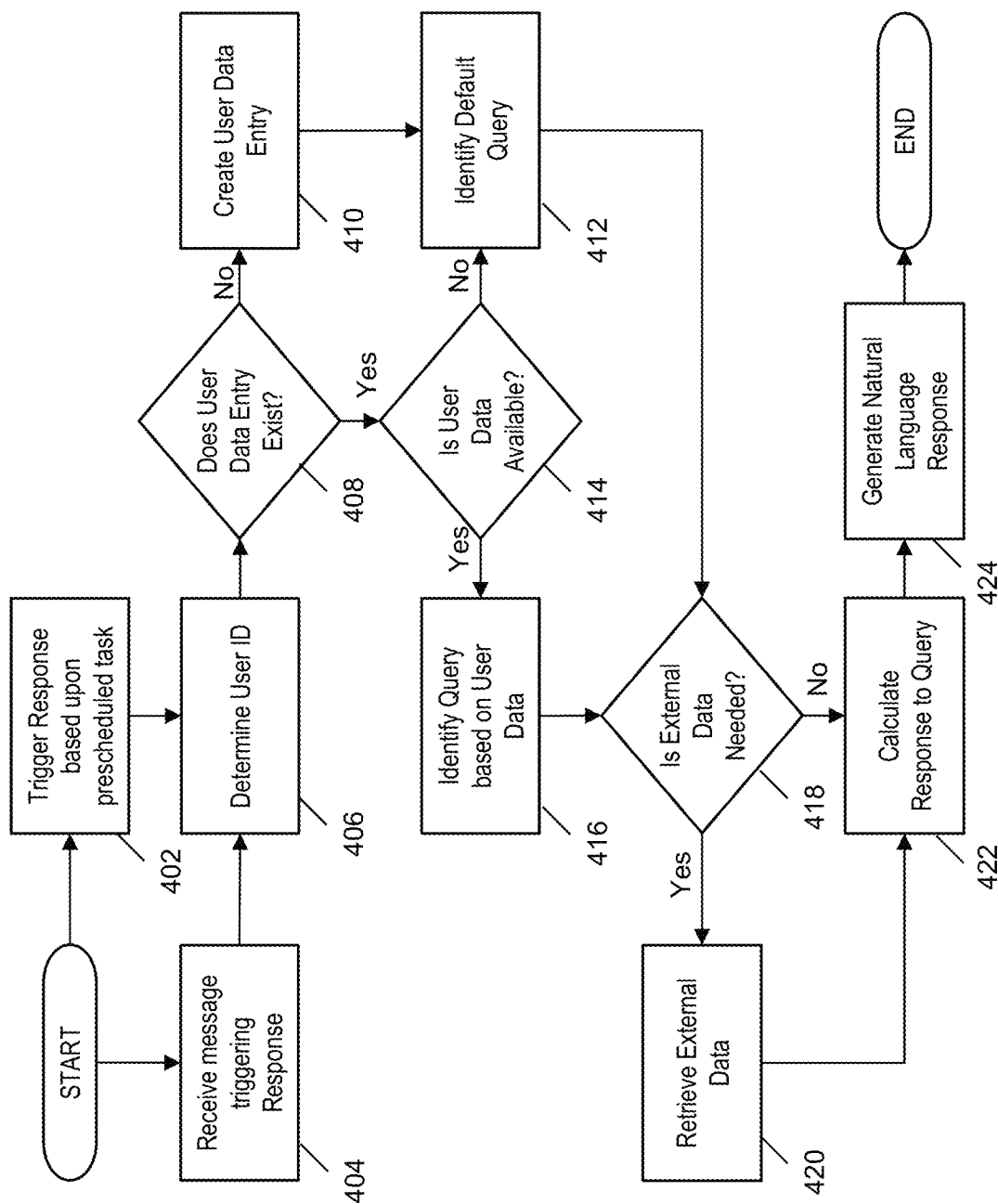
FIG. 4 is a flow diagram illustrating a method for automatic reporting of analytics and distribution of advice using a conversational interface.

Process for Providing Sales Information and Insights Through a Conversational Interface FIG. 4 is a flow diagram illustrating a method for automatic reporting of analytics and distribution of advice using a conversational interface.

In step 402, a response may be triggered based upon a prescheduled task. The prescheduled task may be directly scheduled by, e.g., an administrator or user of system 100, or may be based upon learned usage patterns of user (e.g., and stored in connection with the user in a user database, user profile, etc.). Alternatively, in step 404, a response may be triggered based upon a message received from user (or a device associated with a user). Such a message may be user login credentials, or may be an indication submitted, e.g., by an application of a computing device associated with a user upon the application being opened, an action being taken in the application, an indication received from computing device that the computing device is located at a particular location (e.g., when a computing device such as 106 is detected as being at the premises of a merchant user 104). In some embodiments, a message triggering a response may be a message received from a user other than the user to which the natural language response is generated (e.g., a message may be triggered based on usage patterns of a user determined to be similar to the user to which the response is to be provided, in real-time after the similar user asks a question, etc.). For instance, if merchant A and merchant B are associated with one another as being similar merchants, when merchant A asks a natural language query, it may be provided as an utterance into a keyboard of a computing device associated with merchant B, etc. In embodiments, a user ID may be determined first and a suggestion triggered subsequently.

In step 406, a user ID may be determined based upon the message received in 404 or the prescheduled task 402. In step 408, it is determined whether a user data entry exists which corresponds to the user identifier determined in step 406.

If a user data entry does not yet exist (e.g., if a merchant user 104 is newly registered to system and a profile has not yet been created, etc.), in step 410, a user data entry corresponding to the user may be created. If a user data entry does exist, the method may proceed to step 414 where it is determined whether user data necessary to process is available (e.g., for processes which identify queries based upon user characteristic data, is user characteristic data available?). If necessary user characteristic data is not available, or a user data entry is newly created, the process may proceed to step 412. In step 412, one or more default queries may be identified (e.g., within a database such as query database 226). If necessary user data is available, the process may proceed to step 416, wherein one or more queries may be identified based upon the user specific data.

In embodiments, step 416 may comprise identifying a query data entry which includes queries asked by the user to which the natural language response is being generated. For instance, the query data entry may store queries related to the user after such queries have been submitted a certain number of times (e.g., three times, etc.). Query data entries may further include information related to the queries, such as an intent and entity previously derived therefrom, a time the query is typically asked, whether additional questions are asked close in time with the query, etc. Based upon the user data (e.g., the user identifier, a set time, etc.), queries may be identified which are most likely to be useful to the user (e.g., based upon the timing of day the response was triggered, etc.). One or more queries may be identified. Based upon the identified queries, a determination as to whether external data is needed to complete the response is made in step 418.

If external data is needed, the data may be retrieved, e.g., by communicating with software running on external devices such as merchant system 114, with payment network 112, etc., in step 420. Once external data has been retrieved in step 420 or if external data is not necessary, the method may proceed to step 422.

In step 422, a response to the one or more identified queries (which may include one or more default queries) may be calculated. In some instances, where partial user data is available, a response may be calculated both on user-specific queries and default queries. In step 424, based upon the calculated response, a natural language response may be generated. The natural language response may be based upon aggregated calculations responsive to multiple identified queries or may be responsive to a single query.

In some instances, user actions taken subsequent to the generation and transmission of the natural language response may be logged in a database (e.g., user database, query database, etc.) in connection with data used to generate the response, in order to further tailor the automatic responses generated to the user.

Figure 5:
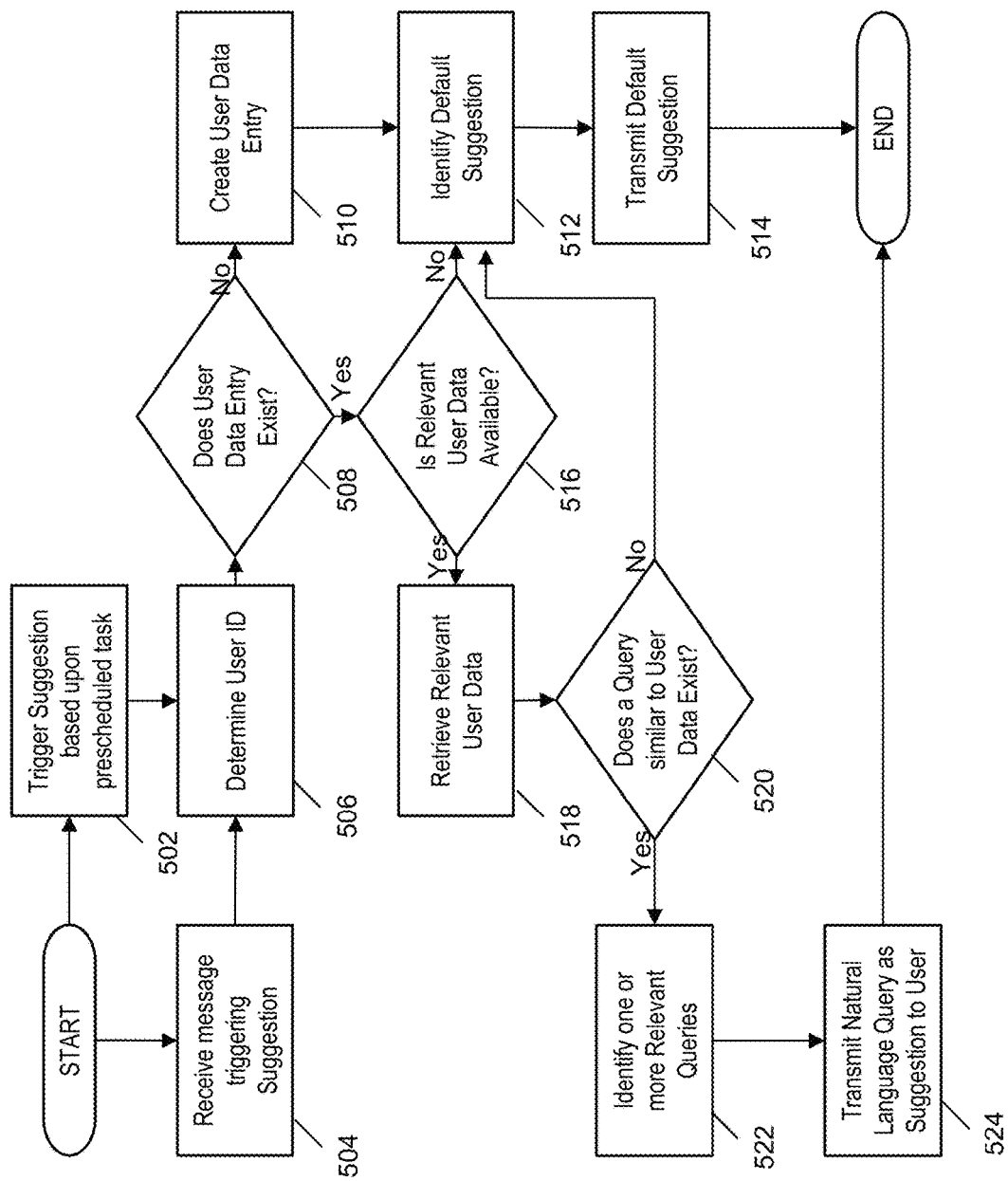
FIG. 5 is a flow diagram illustrating a method for providing intelligent, crowd-sourced options to a user via a conversational interface.
Figure 6:
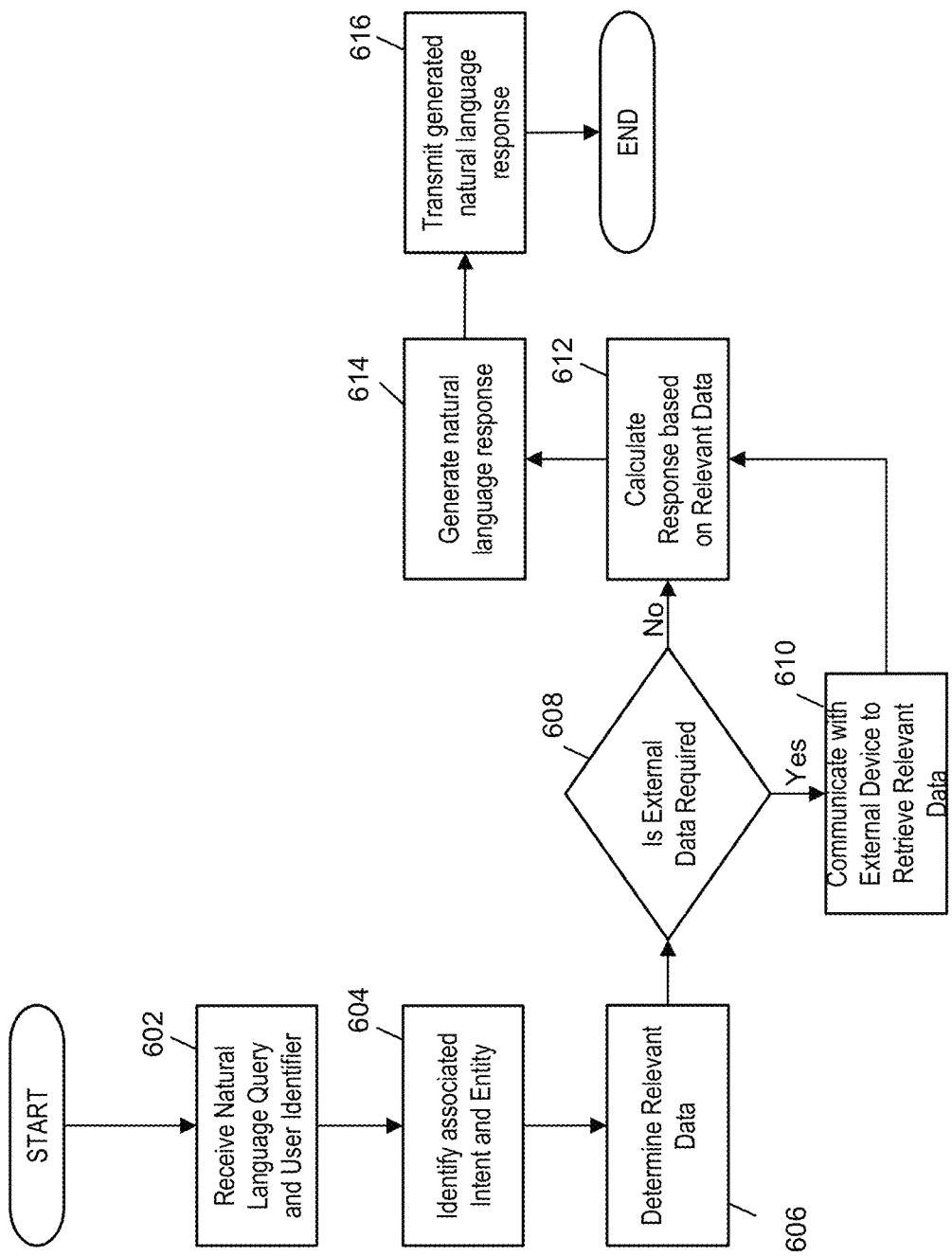
FIG. 6 is a flow diagram illustrating a method performed in response to receiving a natural language query and user identifier.

Exemplary Method for Providing Intelligent Crowd-Sourced Options to a User Via a Conversational Interface FIG. 5 is a flow diagram illustrating a method for providing intelligent, crowd-sourced options to a user via a conversational interface.

At step 502, a suggestion may be triggered based upon a prescheduled task such as those described within this disclosure. The task may be stored, e.g., in connection with a merchant, such as user 104. In some instances the process of FIG. 5 may be triggered based upon a message (e.g., a message indicating a user has opened an application comprising a conversational interface for interacting with processing server 102, etc.), such as in step 504. In step 506, a user ID may be determined. In embodiments, a user ID may be determined first and a suggestion triggered subsequently.

At step 508, a user data entry corresponding to the user identifier may be determined. If no user data entry exists, a user data entry may be created corresponding to the user identifier in step 510. In step 512 a default suggestion may be identified for the user and in step 514, the suggestion may be transmitted to the user. The default suggestion may be identified from, e.g., a query database entry stored in association with an indication that it is a default query data entry. The query data entry may comprise natural language text of a question. In embodiments, the query data entry may be stored in association with at least one intent and at least one entity related to the natural language text. In embodiments, the default suggestion transmitted in step 514 may be associated with a user identifier of the user to which it is transmitted.

If a user data entry exists in step 508, it is determined whether relevant user data is available in step 516. If not, the process may proceed to step 512 to identify a default suggestion and transmit the default suggestion in step 514. If relevant user data is available, the process may proceed to step 518 to retrieve the relevant user data. User data may be located, for instance, in a user database such as within a user data entry 208 of user database 206. User data may be identified, e.g., on the basis of user data entry 208 within merchant database 230, etc. In embodiments, a user identifier may be determined based on a user data entry and the user identifier may be used to determine a merchant data entry corresponding to a user identifier of the user data entry (e.g., representing a same merchant as the user) or a merchant data entry corresponding to a merchant similar to (but not the same as) the user associated with the user data entry. In embodiments, the user identifier and/or characteristics of a user may be used to determine a group of merchants to which the user is most similar (e.g., the user identifier may be used to query a merchant database and find a merchant group of which the user is a member, one or more user characteristics may be used to identify a merchant group or one or more individual merchants to which the user is similar, etc.).

In step 520, it may be determined whether a query corresponding to the user data exists. A query may be identified based upon the user data. For instance, queries asked by similar merchants may be identified and stored in a query database such as database 226 as query data entries. User characteristic data, a user identifier, similar merchant data (e.g., merchant identifiers, merchant group number, etc.), etc. may be used to identify one or more queries submitted by similar users to the user for which the suggestion is being determined.

In step 522, one or more queries may be identified which are relevant to a user associated with the user identifier determined in step 506. In step 524, natural language query suggestions may be transmitted to the user associated with the user identifier determined in step 506.

When the default suggestion transmitted in 514 or the natural language query suggestion transmitted in 524 are received by a device of the user to which they are transmitted, they may cause the user device to automatically display the suggestion (e.g., by prepopulating a keyboard of the user device, by auto-playing an audio file, etc.).

Exemplary Method for Providing Sales Information and Insights to a User-Selected Query Via a Conversational Interface At step 602, in response to the provided suggestions of process 500, the processing server 102 may receive one or more user-selected natural language queries from the natural language suggestions transmitted to user in steps 514 and/or 524. Here, the receiving device 202 of a processing server 102 may be employed to receive the user-selected natural language query from a computing device, such as computing device 106.

At step 604, the processing server 102 may process the natural language query using the natural language processor 224. In embodiments, the user-selected natural language query may be derived to provide at least one intent and at least one entity. In embodiments, the user-selected natural language query may have already been derived to provide an intent and entity and the intent and entity may be received as part of the user-selected query. For instance, the intent and entity may have been derived from a query received from a merchant other than merchant 104 from which the user-selected natural language query is received. In embodiments, the user-selected natural language query may be compared to a database to determine an entity and intent associated therewith and/or the entity and intent may be included in the user-selected query received by the processing server 102.

At step 606, relevant data to the received query may be determined in a similar fashion to that described in connection with the automatic querying process of this disclosure. In step 608, if external data is required, external data may be retrieved by communicating with an external software program and/or device in step 610. In step 612, a response may be calculated based upon the derived intent and entity as well as the retrieved data.

In step 614, a natural language response may be generated based upon the calculated response. And in step 616, the natural language response may be transmitted to a user (e.g., via computing device 106).

Exemplary User Mobile Application Screen for a Conversational Interface

Figure 7:
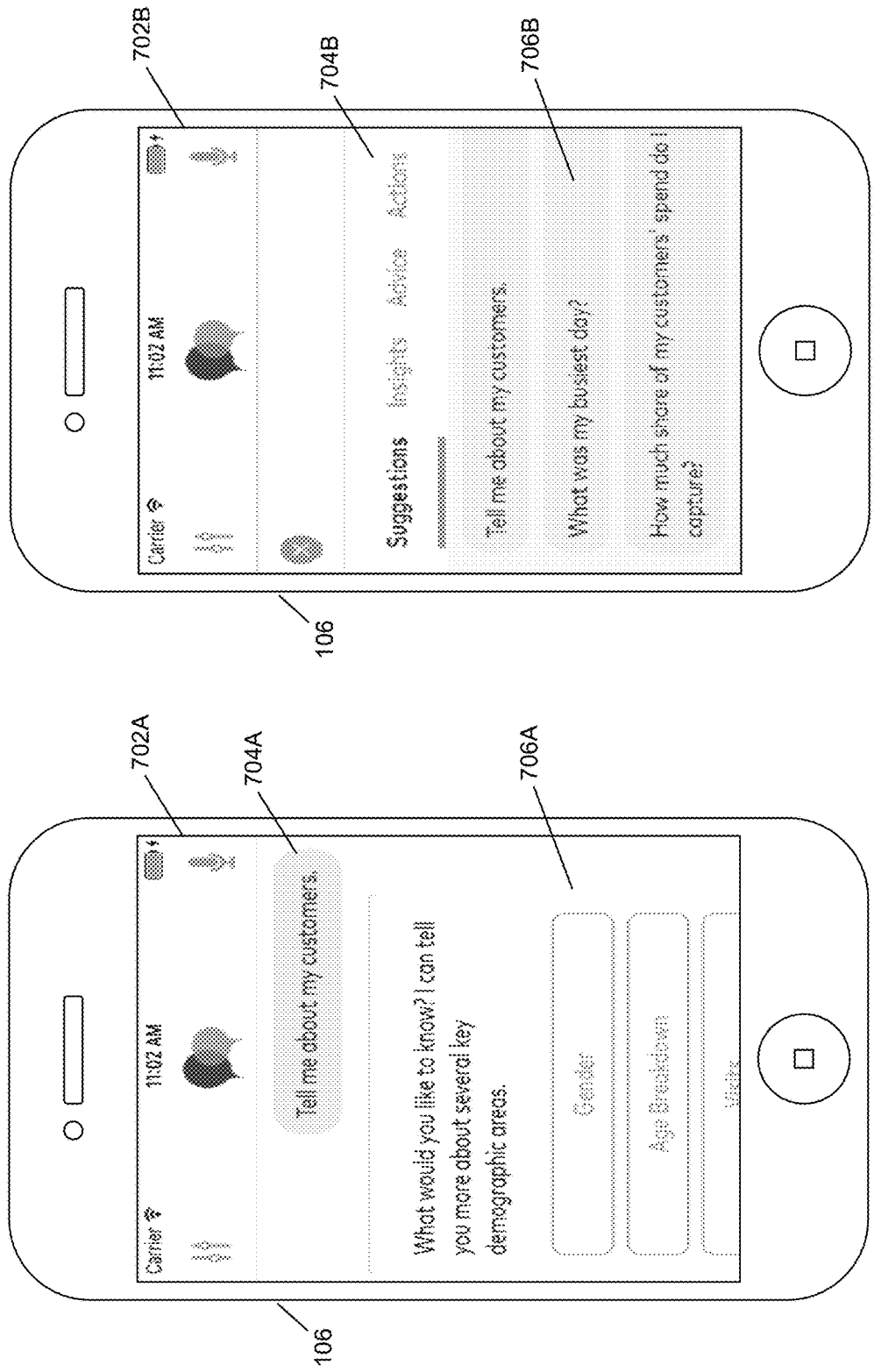
FIGS. 7A and 7B are illustrations depicting a user mobile application screen for a conversational interface in accordance with exemplary embodiments discussed herein.

FIG. 7A depicts a conversational interface which may be implemented in connection with embodiments discussed herein. Computing device 106 is depicted which comprises a display 702A. Within display 704A, a user may submit a natural language query or command. For instance, in FIG. 7A, a user enters "Tell me about my customers" and submits this command to a system (e.g., processing server 102). Processing server may query a database using a derived intent and/or entity and determine additional information is necessary to identify a relevant query. For instance, processing server 102 may determine 100 possible queries related to the natural language based query and may identify, e.g., the most used queries to provide a merchant user with suggested queries.

For instance, in response to the command "Tell me about my customers," the processing server 102 may transmit a message to a user which causes a user display to display suggestions identifying the type of customer data which may be provided. In FIG. 7A, display 702A displays suggestions 706A which populate a user screen with the following: "What would you like to know? I can tell you more about several key demographic areas" and list buttons entitled "Gender," "Age Breakdown," "Visits," etc. In response to a user selection, consumer device 106 may transmit the selected data to processing server 102 which may then interact, e.g., with merchant system 114, payment network 112, and/or additional databases to determine relevant data to return to user via device 106.

FIG. 7B provides a consumer device 106 with display 702B. The display 702B may include, e.g., a menu bar which provides for various options for a user. One of these menu items may be, e.g., suggestions. When a user clicks on the suggestions tab, a screen may be displayed to the user which provides for various query suggestions. For instance, "What was my busiest day?" or "Tell me about my customers" may be suggested to user and a user may select from one of these suggestions (e.g., by using a touch screen to identify the selected gesture, etc.). In response, additional suggestions may be provided to a user (e.g., such as in FIG. 7A) to further guide the user to relevant and useful analytics for that user.

Exemplary Method for Providing an Automatic Natural Language Response

Method 800 is a method for providing an automatic natural language response. At step 802, first user data may be identified which comprises a first user identifier and first user characteristic data. First user characteristic data may comprise, e.g., user location data, merchant size data, industry data (e.g., type, etc.), types of goods/products sold, or other merchant analytic data. User characteristic data may be stored in connection with a user identifier identifying a user of system 100, in connection with a merchant identifier associated with the user identifier, etc., in one or more databases at processing server 102 or external thereto.

In step 804, first user data may be implemented to query a query database. The first user data may be based upon a user profile and user characteristics associated with the first user, based upon characteristics associated with merchants similar to the first user, etc. The first user data may comprise a merchant group identifier identifying a cluster of merchants to which the user identifier and/or user characteristics associated with the identifier, belong (e.g., a merchant cluster of similar merchants stored in a merchant database such as database 230, etc.). Merchant database may be stored, e.g., within payment network 112, etc. Merchant database may comprise merchant listings and groupings with merchants grouped based upon relative similarity scores. Merchant database may also be searched based on first user identifier to determine merchants with relativity scores higher than, e.g., 90%. Characteristics, group identifiers, and/or merchant identifiers corresponding to those identified merchant listings may be implemented as first user data to query a query database in step 804. User characteristics upon which query database may be queried include merchant characteristics (e.g., size, location, industry, etc.), merchant query submission similarity (e.g., a score assigned to merchant users of system 100 which groups merchants who ask similar questions with each other), user usage patterns (e.g., time of day associated with user queries of one or multiple users, etc.).

In step 806, at least one query data entry associated with data similar to the first user data may be identified in the query database. For instance, the identified query data entry may be a query data entry associated with a group of merchants to which the first user belongs (e.g., a group of small businesses conducting similar amounts of sales per year in a same industry, etc.). In some instances, the query data entry may comprise characteristic data of one or more merchants similar to the user, etc. The query data entries may comprise one or more natural language queries which have been previously asked by a user of the system.

In step 808, a processor may retrieve, from the identified at least one query data entry, natural language query data based upon at least one natural language query which has been previously received from at least one user of a plurality of users. The user may be the same or different than the first user.

Step 810 comprises determining, based upon the retrieved natural language query data, at least one intent and at least one entity of the at least one natural language query. In some embodiments, the at least one intent and at least one entity may be stored in the query data entry. In some embodiments, natural language query text of the query data entry may be processed to determine at least one intent and at least one entity.

Step 812 comprises identifying, based upon the retrieved natural language query date, at least one set of data to be used in the generation of a natural language response. For instance, an intent may refer to a comparison between a first user and one or more similar merchants. The processor may communicate with a payment network to determine merchant data and sales data for the first user and similar merchants. The similar merchant data may be aggregated so as to not render any compared merchant identifiable to the first user. The processor may be configured so as to determine systems with which communication is necessary and to communicate with various systems (e.g., via an API) to retrieve data necessary for the analytical model calculation.

In step 814, the identified data may be retrieved (e.g., from external systems, local databases, etc.). In step 816, a response may be calculated to the at least one natural language query based on the retrieved set of data and the first identifier using at least one analytical model. For instance, if a comparison is to be made between a first user and similar merchants, the first user data may be analyzed separately from the similar merchant data and results may be compared to determine differences and similarities between the data. For instance, if sales are lower for first user on a weekend, hours of operation from a similar merchant (or similar merchants) with higher and lower sales may be compared to the first user's hour of operations to determine if a correlation exists between hours opened and increase of sales. Additional factors may be taken into account in such a comparison (e.g., location, industry, timing of sales, etc.) to provide a robust analytical response to the query.

In step 818, a natural language response may be generated to the query. The response may be part of an automatic report process which does not require a user to actively ask questions. The natural language response may be based upon the calculated response. For instance, the calculated response may provide data indicating similar merchants to first user that are open at 8 a.m. on the weekend tend to have higher sales. First user may open at 9 a.m. on the weekend. The natural language response may take into account the time, sales, and other data and generate a response such as "To boost sales on the weekend, try opening one hour earlier." Multiple responses may be generated and aggregated into a story-type report to be provided to first user.

In step 820, the natural language response may be stored in connection with the first user identifier (e.g., at a server, awaiting a login from user, etc.) or may be transmitted to a user device associated with the first user identifier (e.g., as an e-mail, an SMS message, a text, a push notification to an application, etc.). The natural language response may be in a text format, an audio format, a combination of the two, etc.

Figure 8:
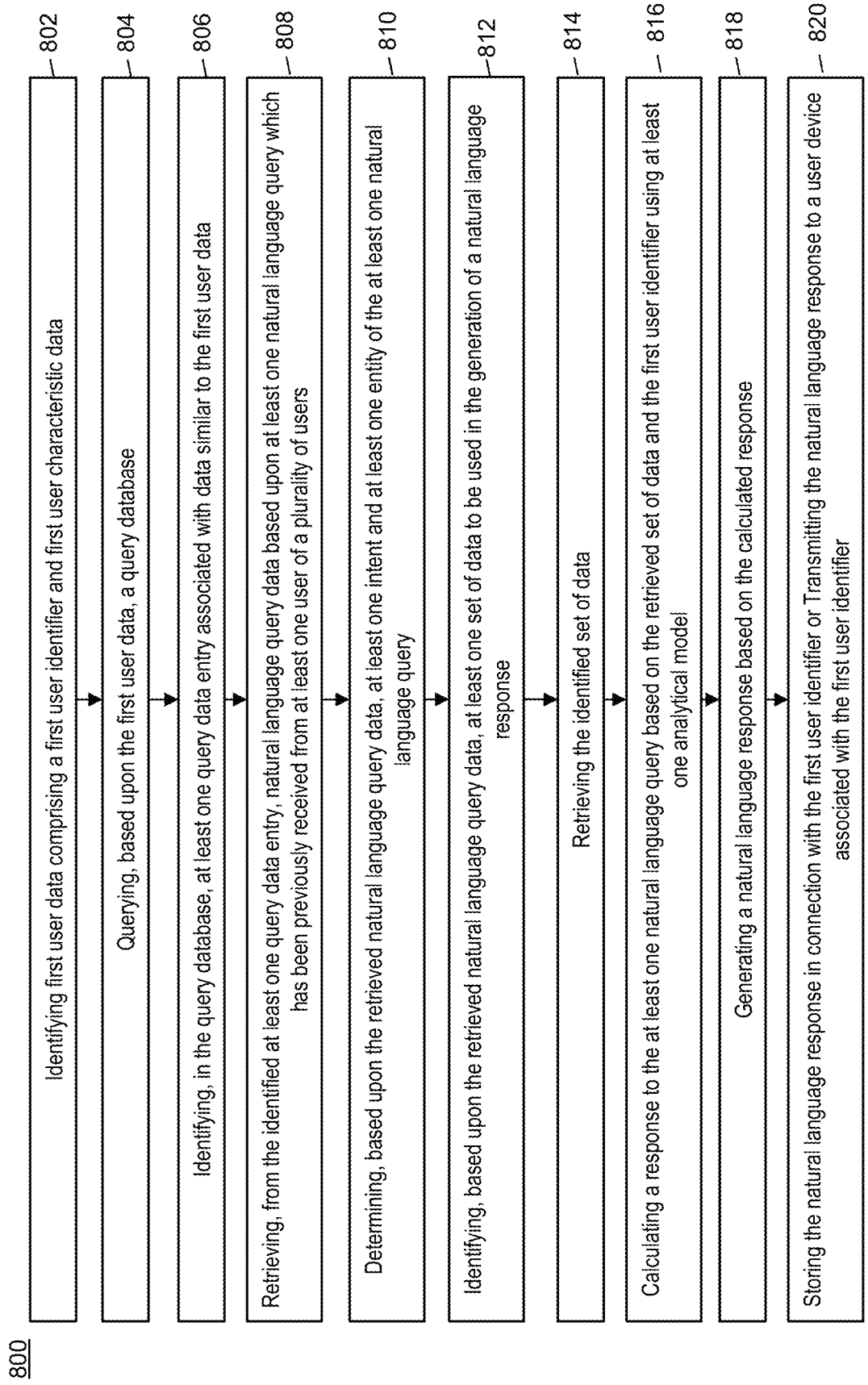
FIG. 8 is a flow diagram providing a process for automatic reporting of analytics and distribution of advice using a conversational interface.
Figure 9:
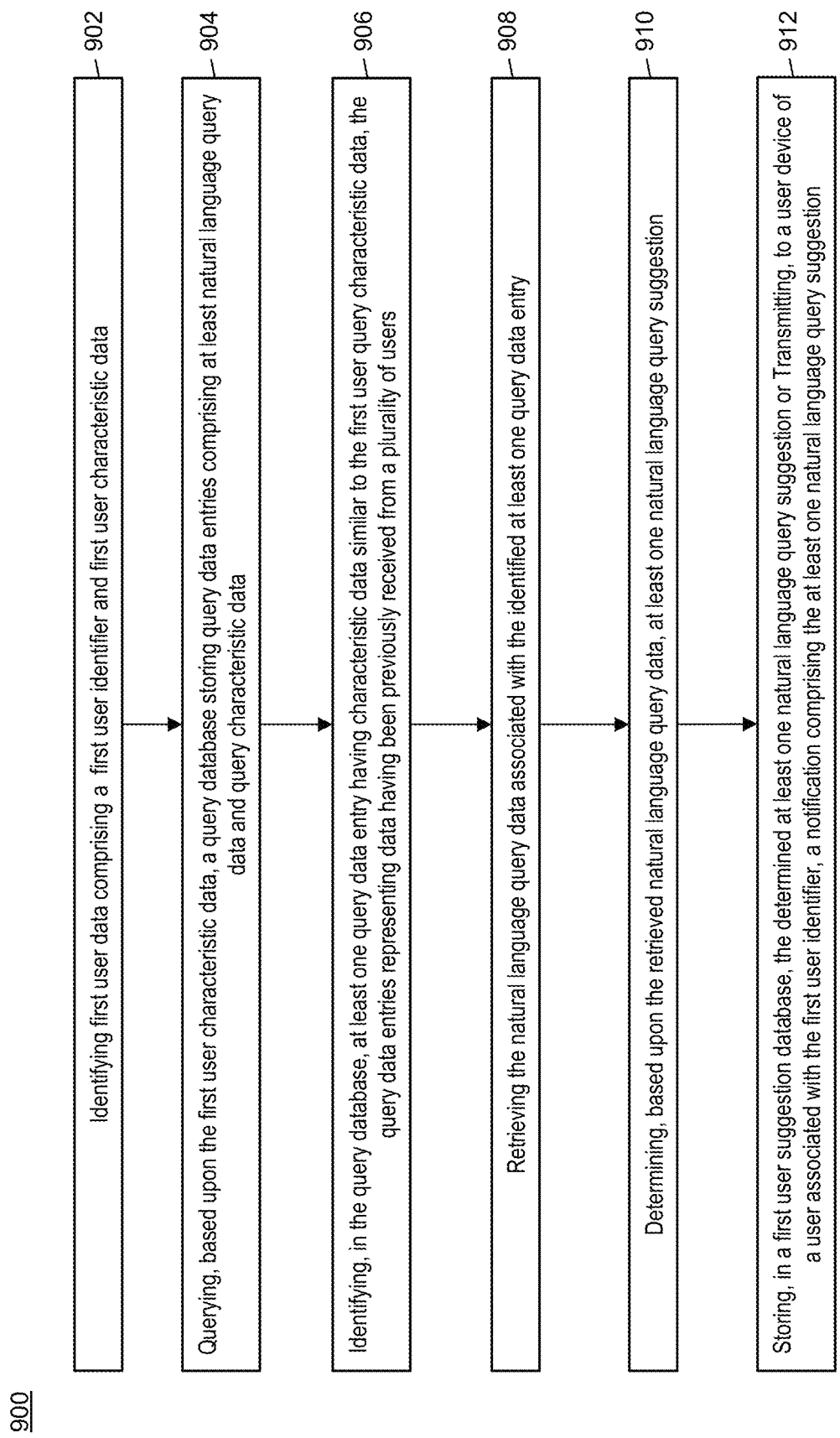
FIG. 9 is a flow diagram providing a process for the distribution of intelligent, crowd-sourced options to a conversational input device.

The method steps of method 800 may be performed sequentially, simultaneously, and in an order other than that presented in FIG. 8, as will be understood by one having skill in the art in light of the present disclosure.

Exemplary Method for the Distribution of Intelligent, Crowd-Sourced Options to a Conversational Input Device Method 900 is a method for the distribution of intelligent, crowd-sourced options to a conversational input device. In step 902, a first user identifier may be used to identify first user data comprising the first user identifier and first user characteristic data.

In step 904, based upon the first user characteristic data, a query database may be queried to determine at least one natural language query data entry comprising natural language query data and query characteristic data. A matching algorithm may be used to determine a match, best fit, or similarity between the user characteristic data and query characteristic data.

In step 906, at least one query data entry is identified. The query data entry represents data having been received from a plurality of users (e.g., as natural language queries).

In step 908, the natural language query data associated with the identified query data entry or entries may be retrieved. A determination may be made, based upon the retrieved natural language query, as to at least one natural language query suggestion. In the determination of at least one natural language suggestion, user-specific data may be implemented. For instance, a natural language query may store data indicating that similar users have asked questions relating to sales of other business located in close proximity to their business location. The natural language suggestion may be customized based on this data to include data specific to the first user. For instance, the first user may be a merchant having a business location at 123 Main Street. The natural language query determined may be, e.g., "Are other businesses on Main Street outperforming my business?" or "Tell me about the customers that shop on Main Street," etc.

In step 910, the determined at least one natural language query suggestion may be stored at a server (e.g., awaiting access from a user via opening a webpage, logging into the server, etc.) or transmitted to a user device (e.g., via e-mail, voice call, text message, a mobile application, etc.). The at least one natural language query suggestion may be provided as an utterance in a device (e.g., computing device 106) within an application.

In some instances, the determined at least one natural language query suggestion may be provided in response to other user questions. For instance, a user may request data such as "Tell me about my customers" and the query database may be searched to determine corresponding natural language query suggestions. Query suggestions may be returned to the user which relate to the "Tell me about my customers" input in real-time (e.g., as in "live-chat"). In embodiments, query suggestions may be generated based upon input of similar users or other triggering events (e.g., prescheduled times, merchant activity, a threshold of sales taking place at merchant, etc.) as disclosed herein. Triggering events may require monitoring of one or more databases or communication with external devices (e.g., communication with a payment network, merchant system, etc. to determine sales activity, wherein when sales activity reaches a threshold, query suggestions are determined). Triggering events may trigger default questions and/or automatic reporting or a combination of the two. For instance, if sales are determined (e.g., based upon periodically polling external devices/databases) to have reached a certain threshold in any given day, both a query report and query suggestion may be provided to a user (e.g., as an utterance in a keyboard of the user). The user's keyboard may, for instance, be populated with a message such as "Sales are up today. Would you like to know why?" or "Sales are up today" with a button for "Tell me why." If a merchant user indicates it would like additional information, the system may, quickly and effectively respond to the question by running analytics on data already retrieved to provide the report. For instance, the sales data may be analyzed to determine several new customers have shopped at the merchant that day and a result may be returned such as "You have several first-time customers who have shopped here today."

The processing system may learn from user-selected queries to enhance its query database and analytical models to provide for increased relevancy and accuracy in responding to user natural language queries, providing query suggestions, and automatic report generation. The learning may be used to enhance future responses, reports and queries for a single user and/or multiple users of a system.

Payment Transaction Processing System and Process

Figure 10:
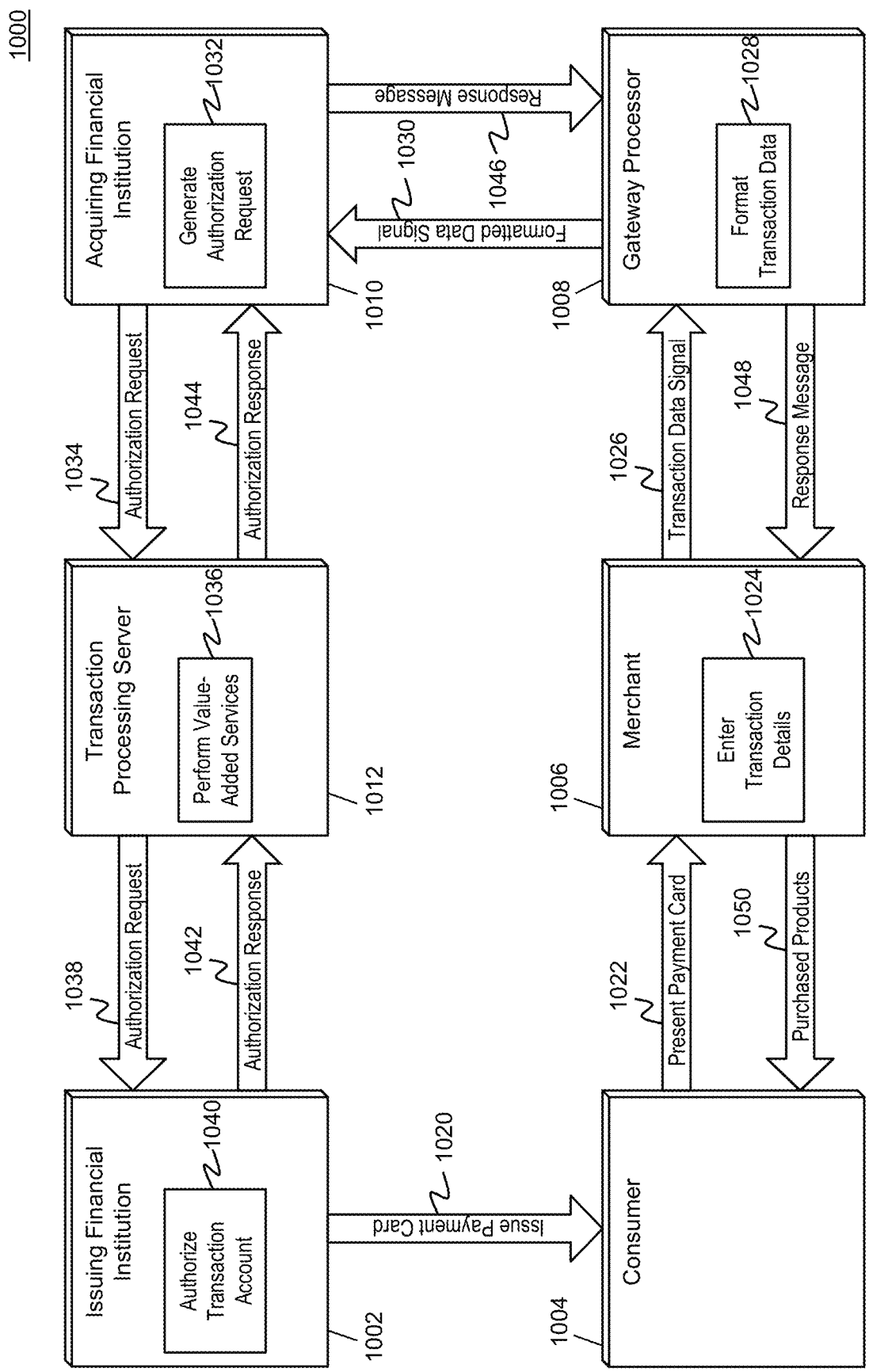
FIG. 10 is a flow diagram illustrating the processing of a payment transaction in accordance with exemplary embodiments.

FIG. 10 illustrates a transaction processing system and a process 1000 for the processing of payment transactions in the system, which may include the processing of thousands, millions, or even billions of transactions during a given period (e.g., hourly, daily, weekly, etc.). The process 1000 and steps included therein may be performed by one or more components of the system 100 discussed above, such as the processing server 102, computing device 106, merchant point of sales devices, etc. The processing of payment transactions using the system and process 1000 illustrated in FIG. 10 and discussed below may utilize the payment rails, which may be comprised of the computing devices and infrastructure utilized to perform the steps of the process 1000 as specially configured and programmed by the entities discussed below, including the transaction processing server 1012, which may be associated with one or more payment networks configured to processing payment transactions. It will be apparent to persons having skill in the relevant art that the process 1000 or portions thereof may be incorporated into or implemented in connection with the processes illustrated in FIGS. 3-6, 8 and 9, discussed above, with respect to the step or steps involved in the processing of a payment transaction or retrieving data associated therewith. In addition, the entities discussed herein for performing the process 1000 may include one or more computing devices or systems configured to perform the functions discussed below. For instance, the merchant 1006 may be comprised of one or more point of sale devices, a local communication network, a computing server, and other devices configured to perform the functions discussed below.

In step 1020, an issuing financial institution 1002 may issue a payment card or other suitable payment instrument to a consumer 1004. The issuing financial institution may be a financial institution, such as a bank, or other suitable type of entity that administers and manages payment accounts and/or payment instruments for use with payment accounts that can be used to fund payment transactions. The consumer 1004 may have a transaction account with the issuing financial institution 1002 for which the issued payment card is associated, such that, when used in a payment transaction, the payment transaction is funded by the associated transaction account. In some embodiments, the payment card may be issued to the consumer 1004 physically. In other embodiments, the payment card may be a virtual payment card or otherwise provisioned to the consumer 1004 in an electronic format.

In step 1022, the consumer 1004 may present the issued payment card to a merchant 1006 for use in funding a payment transaction. The merchant 1006 may be a business, another consumer, or any entity that may engage in a payment transaction with the consumer 1004. The payment card may be presented by the consumer 1004 via providing the physical card to the merchant 1006, electronically transmitting (e.g., via near field communication, wireless transmission, or other suitable electronic transmission type and protocol) payment details for the payment card, or initiating transmission of payment details to the merchant 1006 via a third party. The merchant 1006 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 1024, the merchant 1006 may enter transaction details into a point of sale computing system. The transaction details may include the payment details provided by the consumer 1004 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 1006 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 1006 may be an online retailer in an e-commerce transaction. In such embodiments, the transaction details may be entered in a shopping cart or other repository for storing transaction data in an electronic transaction as will be apparent to persons having skill in the relevant art.

In step 1026, the merchant 1006 may electronically transmit a data signal superimposed with transaction data to a gateway processor 1008. The gateway processor 1008 may be an entity configured to receive transaction details from a merchant 1006 for formatting and transmission to an acquiring financial institution 1010. In some instances, a gateway processor 1008 may be associated with a plurality of merchants 1006 and a plurality of acquiring financial institutions 1010. In such instances, the gateway processor 1008 may receive transaction details for a plurality of different transactions involving various merchants, which may be forwarded on to appropriate acquiring financial institutions 1010. By having relationships with multiple acquiring financial institutions 1010 and having the requisite infrastructure to communicate with financial institutions using the payment rails, such as using application programming interfaces associated with the gateway processor 1008 or financial institutions used for the submission, receipt, and retrieval of data, a gateway processor 1008 may act as an intermediary for a merchant 1006 to be able to conduct payment transactions via a single communication channel and format with the gateway processor 1008, without having to maintain relationships with multiple acquiring financial institutions 1010 and payment processors and the hardware associated thereto. Acquiring financial institutions 1010 may be financial institutions, such as banks, or other entities that administers and manages payment accounts and/or payment instruments for use with payment accounts. In some instances, acquiring financial institutions 1010 may manage transaction accounts for merchants 1006. In some cases, a single financial institution may operate as both an issuing financial institution 1002 and an acquiring financial institution 1010.

The data signal transmitted from the merchant 1006 to the gateway processor 1008 may be superimposed with the transaction details for the payment transaction, which may be formatted based on one or more standards. In some embodiments, the standards may be set forth by the gateway processor 1008, which may use a unique, proprietary format for the transmission of transaction data to/from the gateway processor 1008. In other embodiments, a public standard may be used, such as the International Organization for Standardization's ISO 8783 standard. The standard may indicate the types of data that may be included, the formatting of the data, how the data is to be stored and transmitted, and other criteria for the transmission of the transaction data to the gateway processor 1008.

In step 1028, the gateway processor 1008 may parse the transaction data signal to obtain the transaction data superimposed thereon and may format the transaction data as necessary. The formatting of the transaction data may be performed by the gateway processor 1008 based on the proprietary standards of the gateway processor 1008 or an acquiring financial institution 1010 associated with the payment transaction. The proprietary standards may specify the type of data included in the transaction data and the format for storage and transmission of the data. The acquiring financial institution 1010 may be identified by the gateway processor 1008 using the transaction data, such as by parsing the transaction data (e.g., deconstructing into data elements) to obtain an account identifier included therein associated with the acquiring financial institution 1010. In some instances, the gateway processor 1008 may then format the transaction data based on the identified acquiring financial institution 1010, such as to comply with standards of formatting specified by the acquiring financial institution 1010. In some embodiments, the identified acquiring financial institution 1010 may be associated with the merchant 1006 involved in the payment transaction, and, in some cases, may manage a transaction account associated with the merchant 1006.

In step 1030, the gateway processor 1008 may electronically transmit a data signal superimposed with the formatted transaction data to the identified acquiring financial institution 1010. The acquiring financial institution 1010 may receive the data signal and parse the signal to obtain the formatted transaction data superimposed thereon. In step 1032, the acquiring financial institution may generate an authorization request for the payment transaction based on the formatted transaction data. The authorization request may be a specially formatted transaction message that is formatted pursuant to one or more standards, such as the ISO 8783 standard and standards set forth by a payment processor used to process the payment transaction, such as a payment network. The authorization request may be a transaction message that includes a message type indicator indicative of an authorization request, which may indicate that the merchant 1006 involved in the payment transaction is requesting payment or a promise of payment from the issuing financial institution 1002 for the transaction. The authorization request may include a plurality of data elements, each data element being configured to store data as set forth in the associated standards, such as for storing an account number, application cryptogram, transaction amount, issuing financial institution 1002 information, etc.

In step 1034, the acquiring financial institution 1010 may electronically transmit the authorization request to a transaction processing server 1012 for processing. The transaction processing server 1012 may be comprised of one or more computing devices as part of a payment network configured to process payment transactions. In some embodiments, the authorization request may be transmitted by a transaction processor at the acquiring financial institution 1010 or other entity associated with the acquiring financial institution. The transaction processor may be one or more computing devices that include a plurality of communication channels for communication with the transaction processing server 1012 for the transmission of transaction messages and other data to and from the transaction processing server 1012. In some embodiments, the payment network associated with the transaction processing server 1012 may own or operate each transaction processor such that the payment network may maintain control over the communication of transaction messages to and from the transaction processing server 1012 for network and informational security.

In step 1036, the transaction processing server 1012 may perform value-added services for the payment transaction. Value-added services may be services specified by the issuing financial institution 1002 that may provide additional value to the issuing financial institution 1002 or the consumer 1004 in the processing of payment transactions. Value-added services may include, for example, fraud scoring, transaction or account controls, account number mapping, offer redemption, loyalty processing, etc. For instance, when the transaction processing server 1012 receives the transaction, a fraud score for the transaction may be calculated based on the data included therein and one or more fraud scoring algorithms and/or engines. In some instances, the transaction processing server 1012 may first identify the issuing financial institution 1002 associated with the transaction, and then identify any services indicated by the issuing financial institution 1002 to be performed. The issuing financial institution 1002 may be identified, for example, by data included in a specific data element included in the authorization request, such as an issuer identification number. In another example, the issuing financial institution 1002 may be identified by the primary account number stored in the authorization request, such as by using a portion of the primary account number (e.g., a bank identification number) for identification.

In step 1038, the transaction processing server 1012 may electronically transmit the authorization request to the issuing financial institution 1002. In some instances, the authorization request may be modified, or additional data included in or transmitted accompanying the authorization request as a result of the performance of value-added services by the transaction processing server 1012. In some embodiments, the authorization request may be transmitted to a transaction processor (e.g., owned or operated by the transaction processing server 1012) situated at the issuing financial institution 1002 or an entity associated thereof, which may forward the authorization request to the issuing financial institution 1002.

In step 1040, the issuing financial institution 1002 may authorize the transaction account for payment of the payment transaction. The authorization may be based on an available credit amount for the transaction account and the transaction amount for the payment transaction, fraud scores provided by the transaction processing server 1012, and other considerations that will be apparent to persons having skill in the relevant art. The issuing financial institution 1002 may modify the authorization request to include a response code indicating approval (e.g., or denial if the transaction is to be denied) of the payment transaction. The issuing financial institution 1002 may also modify a message type indicator for the transaction message to indicate that the transaction message is changed to be an authorization response. In step 1042, the issuing financial institution 1002 may transmit (e.g., via a transaction processor) the authorization response to the transaction processing server 1012.

In step 1044, the transaction processing server 1012 may forward the authorization response to the acquiring financial institution 1010 (e.g., via a transaction processor). In step 1046, the acquiring financial institution may generate a response message indicating approval or denial of the payment transaction as indicated in the response code of the authorization response, and may transmit the response message to the gateway processor 1008 using the standards and protocols set forth by the gateway processor 1008. In step 1048, the gateway processor 1008 may forward the response message to the merchant 1006 using the appropriate standards and protocols. In step 1070, the merchant 1006 may then provide the products purchased by the consumer 1004 as part of the payment transaction to the consumer 1004.

In some embodiments, once the process 1000 has completed, payment from the issuing financial institution 1002 to the acquiring financial institution 1010 may be performed. In some instances, the payment may be made immediately or within one business day. In other instances, the payment may be made after a period of time, and in response to the submission of a clearing request from the acquiring financial institution 1010 to the issuing financial institution 1002 via the transaction processing server 1002. In such instances, clearing requests for multiple payment transactions may be aggregated into a single clearing request, which may be used by the transaction processing server 1012 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 1040), the transaction processing server 1012 may be configured to perform authorization of transactions on behalf of the issuing financial institution 1002. Such actions may be referred to as "stand-in processing," where the transaction processing server "stands in" as the issuing financial institution 1002. In such instances, the transaction processing server 1012 may utilize rules set forth by the issuing financial institution 1002 to determine approval or denial of the payment transaction, and may modify the transaction message accordingly prior to forwarding to the acquiring financial institution 1010 in step 1044. The transaction processing server 1012 may retain data associated with transactions for which the transaction processing server 1012 stands in, and may transmit the retained data to the issuing financial institution 1002 once communication is reestablished. The issuing financial institution 1002 may then process transaction accounts accordingly to accommodate for the time of lost communication.

In another example, if the transaction processing server 1012 is unavailable for submission of the authorization request by the acquiring financial institution 1010, then the transaction processor at the acquiring financial institution 1010 may be configured to perform the processing of the transaction processing server 1012 and the issuing financial institution 1002. The transaction processor may include rules and data suitable for use in making a determination of approval or denial of the payment transaction based on the data included therein. For instance, the issuing financial institution 1002 and/or transaction processing server 1012 may set limits on transaction type, transaction amount, etc. that may be stored in the transaction processor and used to determine approval or denial of a payment transaction based thereon. In such instances, the acquiring financial institution 1010 may receive an authorization response for the payment transaction even if the transaction processing server 1012 is unavailable, ensuring that transactions are processed and no downtime is experienced even in instances where communication is unavailable. In such cases, the transaction processor may store transaction details for the payment transactions, which may be transmitted to the transaction processing server 1012 (e.g., and from there to the associated issuing financial institutions 1002) once communication is reestablished.

In some embodiments, transaction processors may be configured to include a plurality of different communication channels, which may utilize multiple communication cards and/or devices, to communicate with the transaction processing server 1012 for the sending and receiving of transaction messages. For example, a transaction processor may be comprised of multiple computing devices, each having multiple communication ports that are connected to the transaction processing server 1012. In such embodiments, the transaction processor may cycle through the communication channels when transmitting transaction messages to the transaction processing server 1012, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 1010 may identify that an authorization request involves an issuing financial institution 1002 (e.g., via the bank identification number included in the transaction message) for which no value-added services are required. The transaction processor at the acquiring financial institution 1010 may then transmit the authorization request directly to the transaction processor at the issuing financial institution 1002 (e.g., without the authorization request passing through the transaction processing server 1012), where the issuing financial institution 1002 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 1012 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 1008, acquiring financial institution 1010, etc.) for processing using this advanced network, and to quickly and efficiently receive a response regarding the ability for a consumer 1004 to fund the payment transaction.

Computer System Architecture

Figure 11:
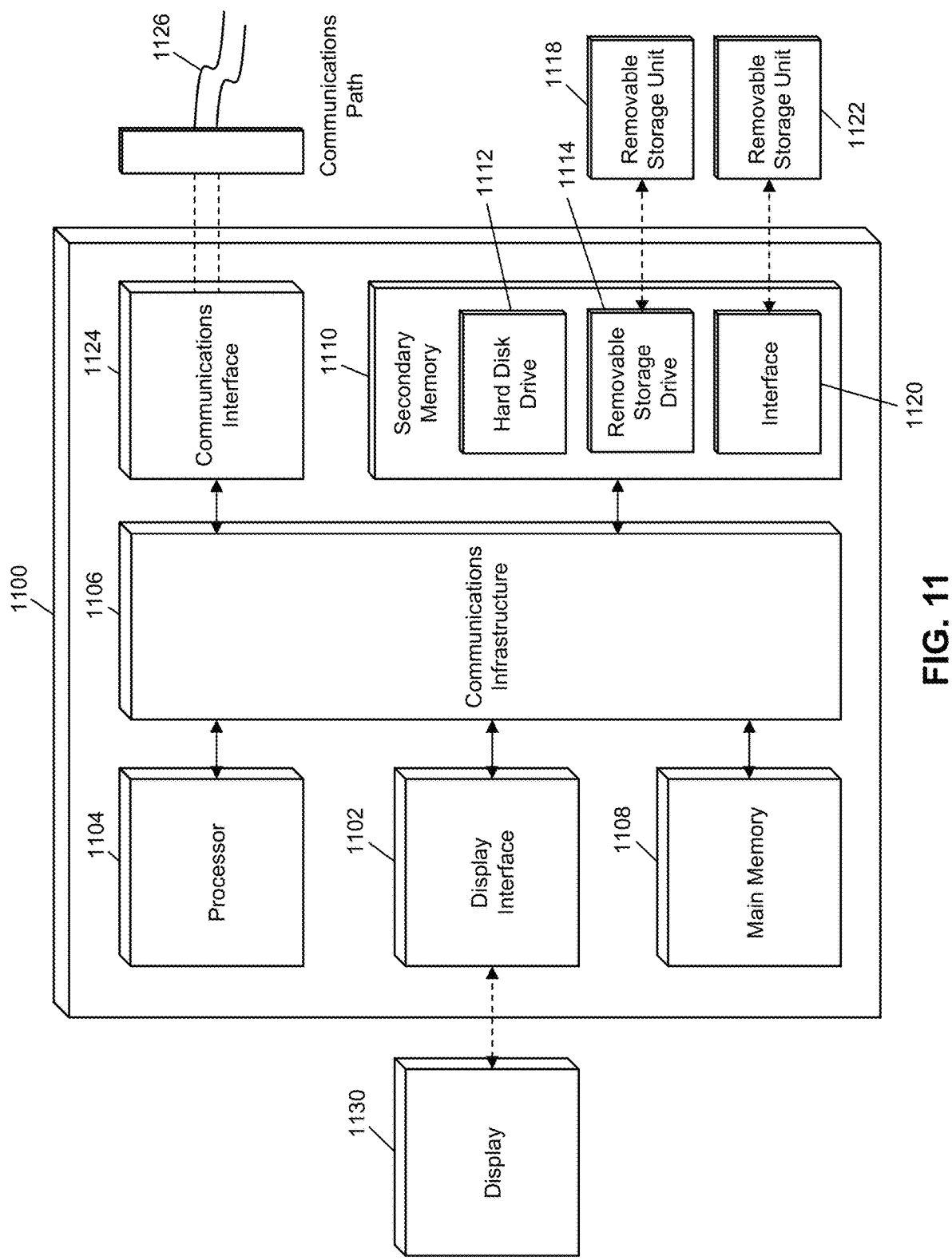
FIG. 11 is a block diagram illustrating a computer system architecture in accordance with exemplary embodiments.

FIG. 11 illustrates a computer system 1100 architecture in accordance with exemplary embodiments. For example, the processing server 110 of FIG. 1 may be implemented in the computer system 1100 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-6, 8 and 9.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1118, a removable storage unit 1122, and a hard disk installed in hard disk drive 1112.

Various embodiments of the present disclosure are described in terms of this example computer system 1100. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1104 may be a special purpose or a general purpose processor device specifically configured to perform the functions discussed herein. The processor device 1104 may be connected to a communications infrastructure 1106, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1100 may also include a main memory 1108 (e.g., random access memory, read-only memory, etc.), and may also include a secondary memory 1110. The secondary memory 1110 may include the hard disk drive 1112 and a removable storage drive 1114, such as a floppy disk drive, a magnetic tape drive, an optical disk drive, a flash memory, etc.

The removable storage drive 1114 may read from and/or write to the removable storage unit 1118 in a well-known manner. The removable storage unit 1118 may include a removable storage media that may be read by and written to by the removable storage drive 1114. For example, if the removable storage drive 1114 is a floppy disk drive or universal serial bus port, the removable storage unit 1118 may be a floppy disk or portable flash drive, respectively. In one embodiment, the removable storage unit 1118 may be non-transitory computer readable recording media.

In some embodiments, the secondary memory 1110 may include alternative means for allowing computer programs or other instructions to be loaded into the computer system 1100, for example, the removable storage unit 1122 and an interface 1120. Examples of such means may include a program cartridge and cartridge interface (e.g., as found in video game systems), a removable memory chip (e.g., EEPROM, PROM, etc.) and associated socket, and other removable storage units 1122 and interfaces 1120 as will be apparent to persons having skill in the relevant art.

Data stored in the computer system 1100 (e.g., in the main memory 1108 and/or the secondary memory 1110) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1100 may also include a communications interface 1124. The communications interface 1124 may be configured to allow software and data to be transferred between the computer system 1100 and external devices. Exemplary communications interfaces 1124 may include a modem, a network interface (e.g., an Ethernet card), a communications port, a PCMCIA slot and card, etc. Software and data transferred via the communications interface 1124 may be in the form of signals, which may be electronic, electromagnetic, optical, or other signals as will be apparent to persons having skill in the relevant art. The signals may travel via a communications path 1126, which may be configured to carry the signals and may be implemented using wire, cable, fiber optics, a phone line, a cellular phone link, a radio frequency link, etc.

The computer system 1100 may further include a display interface 1102. The display interface 1102 may be configured to allow data to be transferred between the computer system 1100 and external display 1130. Exemplary display interfaces 1102 may include high-definition multimedia interface (HDMI), digital visual interface (DVI), video graphics array (VGA), etc. The display 1130 may be any suitable type of display for displaying data transmitted via the display interface 1102 of the computer system 1100, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1108 and secondary memory 1110, which may be memory semiconductors (e.g., DRAMs, etc.). These computer program products may be means for providing software to the computer system 1100. Computer programs (e.g., computer control logic) may be stored in the main memory 1108 and/or the secondary memory 1110. Computer programs may also be received via the communications interface 1124. Such computer programs, when executed, may enable computer system 1100 to implement the present methods as discussed herein. In particular, the computer programs, when executed, may enable processor device 1104 to implement the methods illustrated by FIGS. 3, 4 and 7-9, as discussed herein. Accordingly, such computer programs may represent controllers of the computer system 1100. Where the present disclosure is implemented using software, the software may be stored in a computer program product and loaded into the computer system 1100 using the removable storage drive 1114, interface 1120, and hard disk drive 1112, or communications interface 1124.

The processor device 1104 may comprise one or more modules or engines configured to perform the functions of the computer system 1100. Each of the modules or engines may be implemented using hardware and, in some instances, may also utilize software, such as corresponding to program code and/or programs stored in the main memory 1108 or secondary memory 1110. In such instances, program code may be compiled by the processor device 1104 (e.g., by a compiling module or engine) prior to execution by the hardware of the computer system 1100. For example, the program code may be source code written in a programming language that is translated into a lower level language, such as assembly language or machine code, for execution by the processor device 1104 and/or any additional hardware components of the computer system 1100. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1100 to perform the functions disclosed herein. It will be apparent to persons having skill in the relevant art that such processes result in the computer system 1100 being a specially configured computer system 1100 uniquely programmed to perform the functions discussed above.

Techniques consistent with the present disclosure provide, among other features, systems and methods for generating and using indexing models for neighborhood growth. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method of providing intelligent natural language query suggestions, comprising:
   upon a preset triggering event in which a user associated with a merchant opens an application or logs into a server, identifying, in a user database, a first user data entry from a plurality of user data entries, wherein the first user data entry (i) is associated with a first merchant, (ii) includes a first user identifier of the first merchant and (ii first user characteristic data of the first merchant, said first user characteristic data being merchant characteristic data and including at least size of the first merchant and historical transaction statistics of the first merchant;
   retrieving, from the first user data entry, on a basis of the user identifier of the first merchant, the first user characteristic data of the first merchant including at least the size of the first merchant and the historical transaction statistics of the first merchant;
   querying, based upon the first user characteristic data, a query database, wherein the query database stores query data entries from a plurality of merchant users and wherein the query data entries comprise at least natural language query data and query characteristic data;
   identifying, from the plurality of query data entries in the query database, a plurality of query data entries of different respective merchants having characteristic data similar to the first user characteristic data of the first merchant such that at least the size of each different respective merchant and the historical transaction statistics of each respective merchant associated with the identified plurality of query data entries is similar to the size of the first merchant and the historical transaction statistics of the first merchant, and wherein the at least natural language query data of each query data entry of the plurality of query data entries identified in the query database comprises a natural language query received from a respective merchant user;
   retrieving, the natural language query data associated with each of the plurality of one query data entries identified in the query database; and
   transmitting, to a user device associated with the first user identifier, a notification comprising at least one natural language query suggestion that includes information that is anonymized such that the information cannot be directly attributed to any specific merchant.

2. The method of claim 1, further comprising:
   receiving, from a second user, a natural language query and a second user identifier;
   identifying, in the user database, a second user data entry;
   retrieving, from the second user data entry, second user characteristic data, the second user characteristic data being merchant characteristic data; and
   storing, in the query database, the natural language query and the second user characteristic data.

3. The method of claim 2, wherein the first user characteristic data is similar to the second user characteristic data and each query data entry of the plurality of query data entries identified in the query database comprises the natural language query stored with the second user characteristic data.

4. The method of claim 2, further comprising:
   receiving, from additional users, additional natural language queries, wherein each of the additional natural language queries are associated with a user identifier other than the first user identifier and the second user identifier;
   comparing the natural language query received from the second user with the additional natural language queries; and determining that the natural language query received from the second user is similar to at least one of the additional natural language queries.

5. The method of claim 4, further comprising:
identifying, in the user database, additional user characteristic data corresponding to the user identifier associated with the at least one additional natural language queries determined to be similar to the natural language query received from the second user; and
determining that the additional characteristic data is similar to the second user characteristic data.

6. The method of claim 1, wherein the natural language query data further comprises at least one intent and at least one entity.

7. The method of claim 1, further comprising:
storing, in a first user suggestion database, the at least one natural language query suggestion, wherein the at least one natural language query suggestion, stored in the first user suggestion database, comprises a natural language query received from a user other than the user associated with the first merchant.

8. The method of claim 1, wherein the notification causes the user device to display a pre-populated keyboard comprising the natural language query suggestion.

9. The method of claim 1, further comprising:
receiving, from the user device, a user-selected query, wherein the user-selected query is identical to a natural language query suggestion of the at least one natural language query suggestion.

10. A system for providing intelligent natural language query suggestions, comprising:
a user database storing a plurality of user data entries, wherein each user data entry includes a user identifier of an associated merchant and user characteristic data of the associated merchant, said user characteristic data being merchant characteristic data and including at least size of the associated merchant and historical transaction statistics of the associated merchant;
a query database storing query data entries from a plurality of merchant users, each query data entry comprising at least natural language query data and query characteristic data; and a processing device configured to:
identify, upon a preset triggering event in which a user associated with a first merchant opens an application or logs into a server, in the user database, a first user data entry from the plurality of user data entries;
retrieve, from the first user data entry, on a basis of the user identifier of the merchant, first user characteristic data of the first merchant including at least the size of the first merchant and the historical transaction statistics of the first merchant involving detected times at which the user opens the application or logs into the server; query, based upon the first user characteristic data, the query database,
identify, from the query data entries stored in the query database, a plurality of query data entries of different respective merchants having characteristic data similar to the first user characteristic data of the first merchant such that at least the size of each different respective merchant and the historical transaction statistics of each respective merchant associated with the identified plurality of query data entries is similar to the size of the first merchant and the historical transaction statistics of the first merchant, wherein the at least natural language query data of each query data entry of the plurality of query data entries identified in the query database comprises a natural language query received from a respective merchant use;
retrieve, the natural language query data associated with each of the plurality of at-query data entries identified in the query database; and
transmit, to a user device associated with the first user identifier, a notification comprising at least one natural language query suggestion that includes information that is anonymized such that the information cannot be directly attributed to any specific merchant.

11. The system of claim 10, wherein the processing device is further configured to:
receive, from a second user, a natural language query and a second user identifier;
identify, in the user database, a second user data entry;
retrieve, from the second user data entry, second user characteristic data, the second user characteristic data being merchant characteristic data; and
store, in the query database, the natural language query and the second user characteristic data.

12. The system of claim 11, wherein the first user characteristic data is similar to the second user characteristic data and each query data entry of the plurality of query data entries identified in the query database comprises the natural language query stored with the second user characteristic data.

13. The system of claim 11, wherein the processing device, is further configured to:
receive, from additional users, additional natural language queries, wherein each of the additional natural language queries are associated with a user identifier other than the first user identifier and the second user identifier;
compare the natural language query received from the second user with the additional natural language queries; and
determine that the natural language query received from the second user is similar to at least one of the additional natural language queries.

14. The system of claim 13, wherein the processing device is further configured to:
identify, in the user database, additional user characteristic data corresponding to the user identifier associated with the at least one additional natural language query determined to be similar to the natural language query received from the second user; and
determine that the additional characteristic data is similar to the second user characteristic data, prior to storing the natural language query in the query database.

15. The system of claim 10, wherein the natural language query data further comprises at least one intent and at least one entity.

16. The system of claim 10, wherein the processing device is further configured to store, in a first user suggestion database, the at least one natural language query suggestion, wherein the at least one natural language query suggestion stored in the first user suggestion database comprises a natural language query received from a user other than the user associated with the first merchant.

17. The system of claim 10, wherein the notification causes the user device to display a pre-populated keyboard comprising the natural language query suggestion.

18. The system of claim 10, wherein the processing device is further configured to receive, from the user device, a user-selected query, wherein the user-selected query is identical to a natural language query suggestion of the at least one natural language query suggestion.

* * * * *